(12) United States Patent
Kashiwai et al.

(10) Patent No.: US 7,896,044 B2
(45) Date of Patent: Mar. 1, 2011

(54) VEHICLE WHEEL HAVING A SUB AIR CHAMBER

(75) Inventors: Mikio Kashiwai, Saitama (JP); Youichi Kamiyama, Saitama (JP); Katsushi Ishii, Saitama (JP); Norio Hayakawa, Shizuoka (JP); Shuhei Yamamoto, Shizuoka (JP); Kenichi Kamio, Shizuoka (JP)

(73) Assignees: Honda Motor Co., Ltd., Tokyo (JP); Nihon Plast Co Ltd, Shizuoka (JP)

( * ) Notice: Subject to any disclaimer, the term of this patent is extended or adjusted under 35 U.S.C. 154(b) by 167 days.

(21) Appl. No.: 12/290,022

(22) Filed: Oct. 24, 2008

(65) Prior Publication Data

US 2009/0108666 A1 Apr. 30, 2009

(30) Foreign Application Priority Data

Oct. 26, 2007 (JP) ................. 2007-278300
Apr. 9, 2008 (JP) ................. 2008-101348

(51) Int. Cl.
*B60C 19/00* (2006.01)
(52) U.S. Cl. .................. 152/381.6; 301/6.91
(58) Field of Classification Search ........... 152/381.5, 152/381.6, 400, 516, 520, 154.1; 301/6.91, 301/95.101
See application file for complete search history.

(56) References Cited

U.S. PATENT DOCUMENTS

| 6,516,849 | B2* | 2/2003 | Flament et al. ............... 152/400 |
| 7,690,410 | B2* | 4/2010 | Kamiyama et al. ......... 152/381.5 |
| 2004/0206437 | A1 | 10/2004 | Akiyama et al. |
| 2004/0250935 | A1* | 12/2004 | Morinaga et al. .......... 152/381.5 |
| 2005/0212350 | A1* | 9/2005 | Yamamoto et al. ....... 301/63.101 |
| 2008/0179939 | A1* | 7/2008 | Kusaka et al. ........... 301/95.104 |
| 2008/0277997 | A1 | 11/2008 | Kamiyama et al. |
| 2009/0072611 | A1* | 3/2009 | Kashiwai et al. ............ 301/5.21 |
| 2010/0090520 | A1* | 4/2010 | Kamiyama et al. ...... 301/95.104 |

FOREIGN PATENT DOCUMENTS

| DE | 198 01 570 A1 | 7/1999 |
| EP | 1 990 213 A | 11/2008 |
| JP | 2004-090669 A | 3/2004 |
| JP | 2004-148978 A | 5/2004 |
| JP | 2006-298231 A | 11/2006 |
| JP | 2007-145191 A | 6/2007 |
| JP | 2009-074595 A | 4/2009 |

* cited by examiner

*Primary Examiner* — Russell D Stormer
(74) *Attorney, Agent, or Firm* — Carrier Blackman & Associates, P.C.; Joseph P. Carrier; William D. Blackman

(57) ABSTRACT

A sub air chamber provided around outer circumferential surface of a well of a rim of a vehicle wheel includes an upper plate and a lower plate connected at edges thereof which are fitted into channels in first and second vertical wall surfaces formed on the rim. At least one of the upper plate and the bottom plate has orthogonally and diagonally aligned beads to vertical walls, extending in a circumferential direction of the wheel, supporting the sub air chamber, connecting parts locally connecting the upper plate and the bottom plate. The sub air chamber has a protruding part for communicating the sub air chamber with the tire air chamber and serves as a stopper of the sub air chamber.

11 Claims, 28 Drawing Sheets

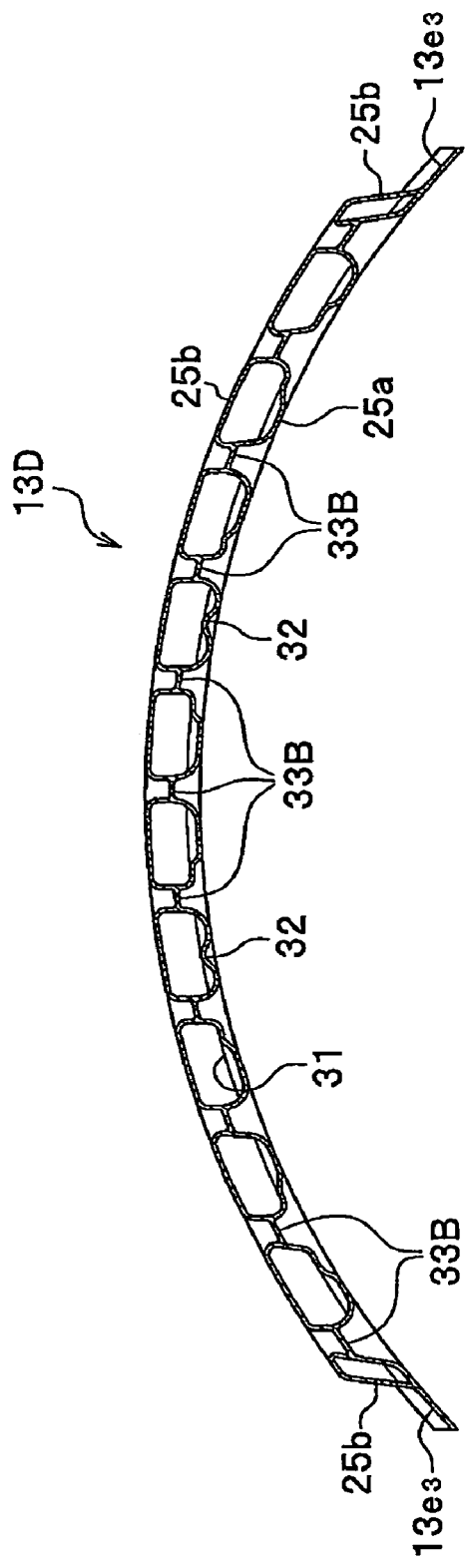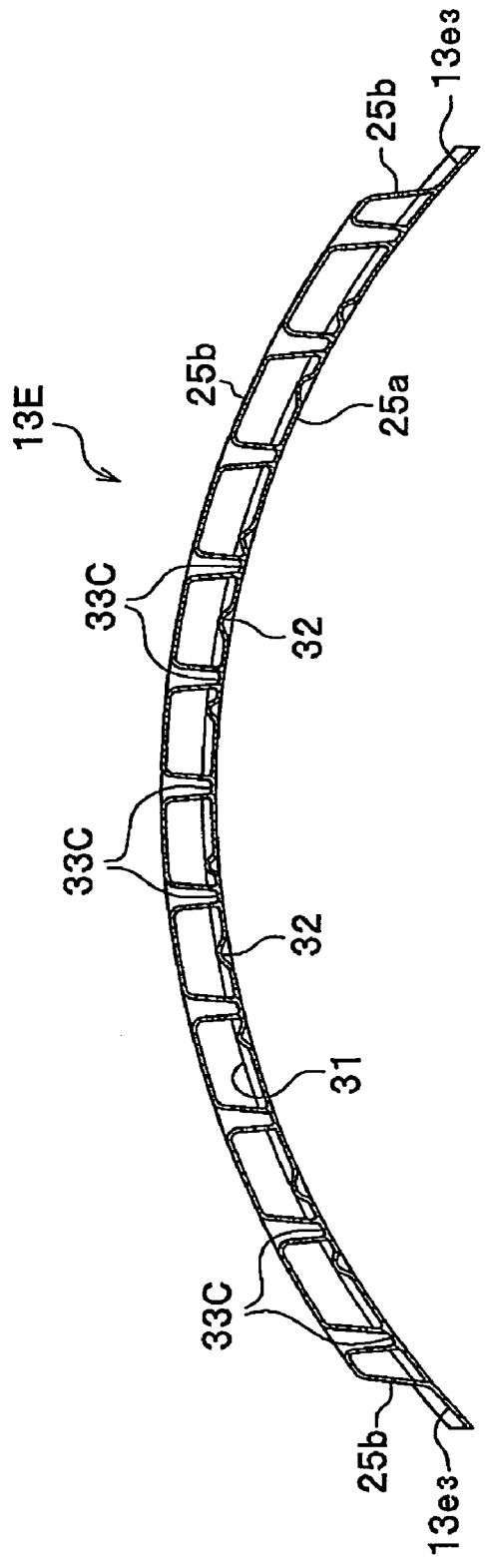

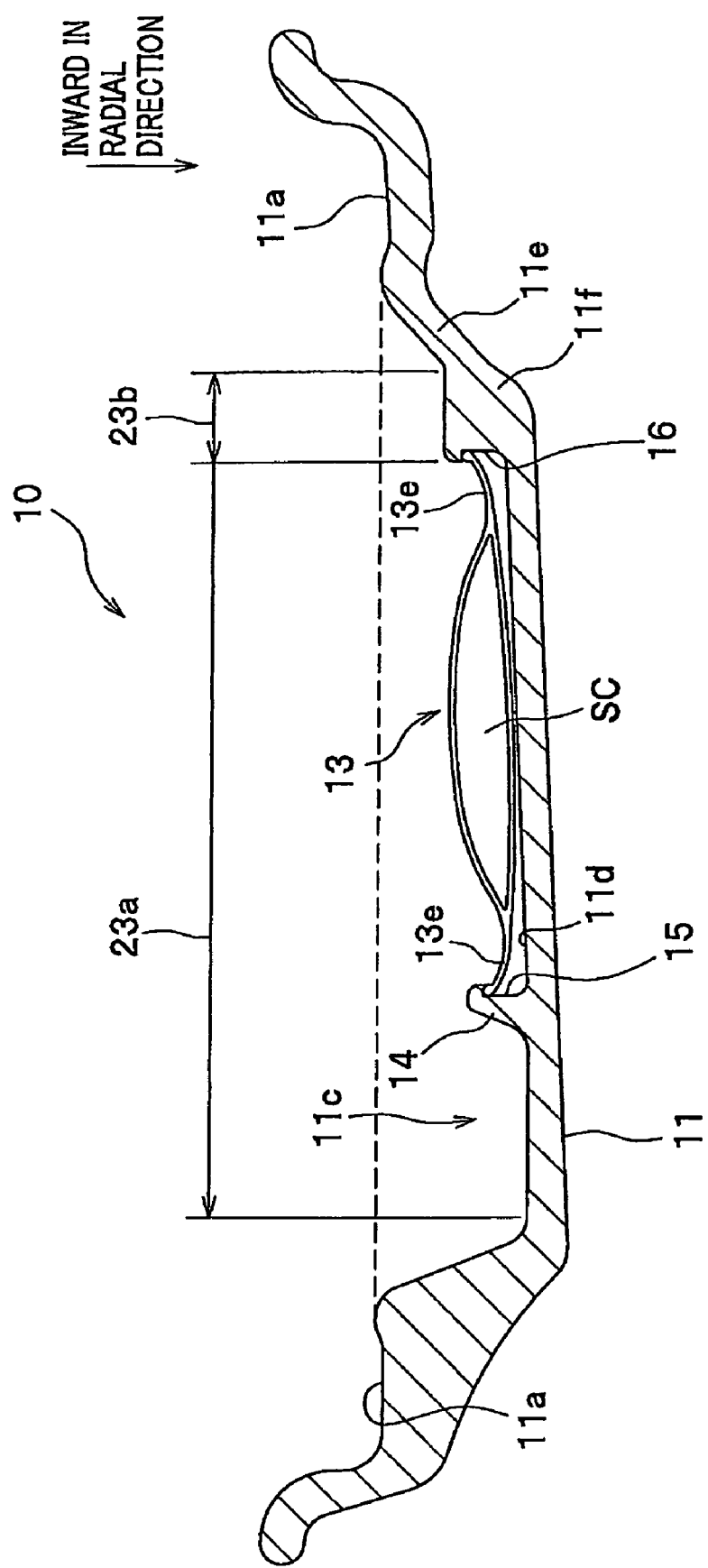

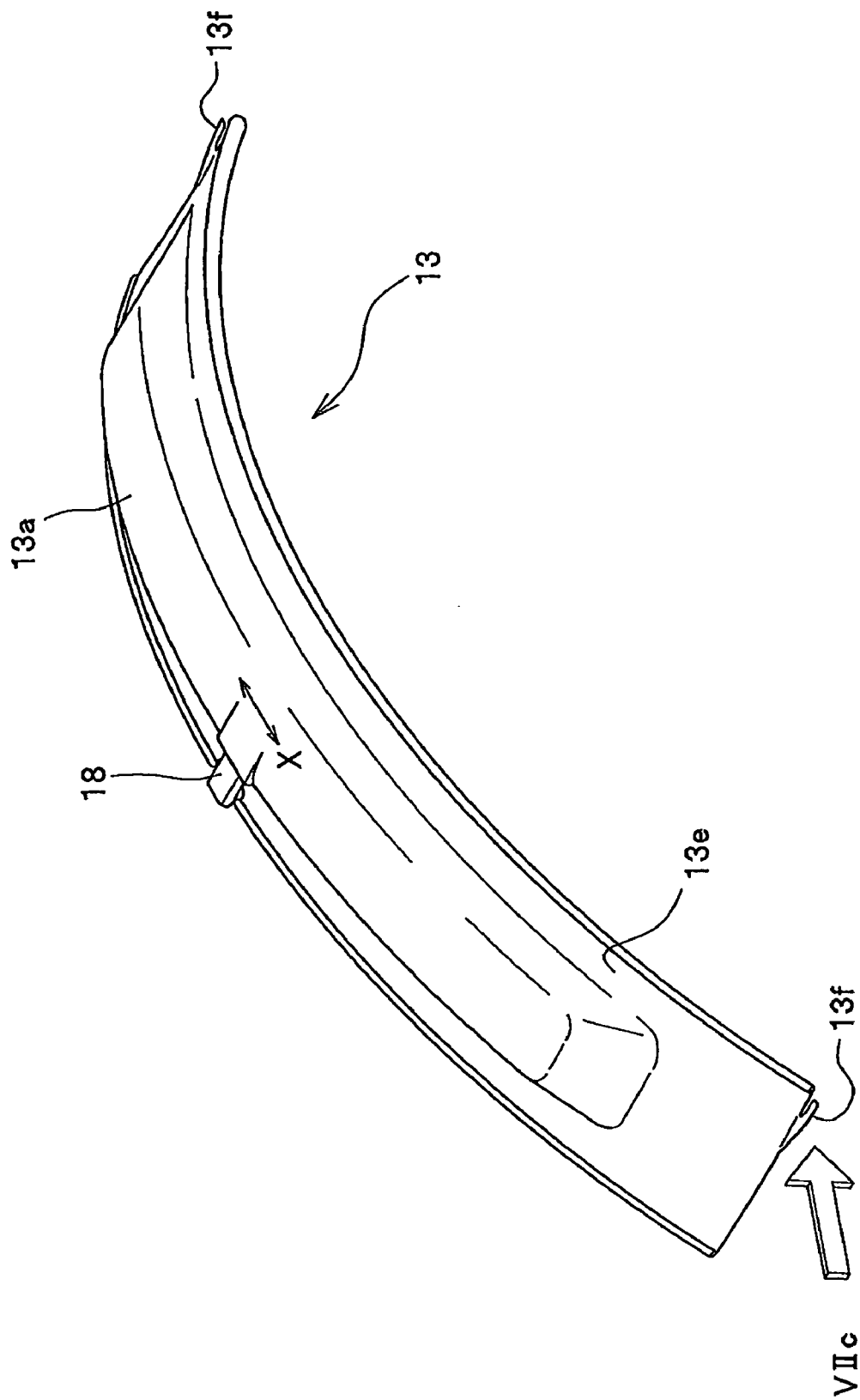

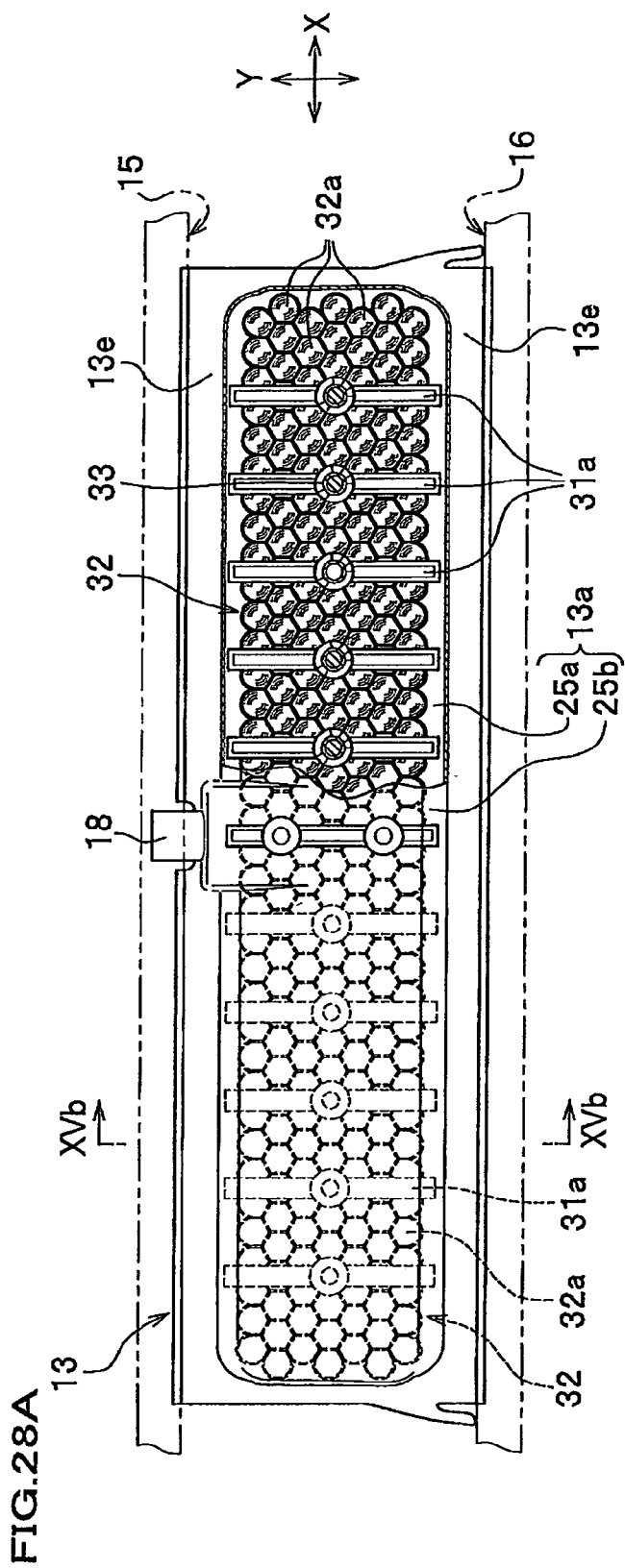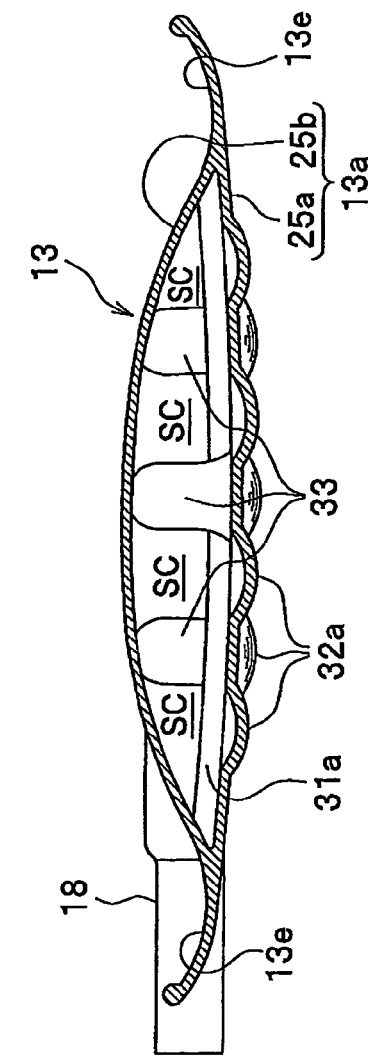

VEHICLE WHEEL HAVING A SUB AIR CHAMBER

CROSS REFERENCE TO RELATED APPLICATIONS

This application claims the foreign priority benefit under Title 35, United States Code, §119(a)-(d) of Japanese Patent Application No. 2007-278300, filed on Oct. 26, 2007 and Japanese Patent Application No. 2008-101348, filed on Apr. 9, 2008, in the Japan Patent Office, the disclosures of which are herein incorporated by reference in its entirety.

BACKGROUND OF THE INVENTION

1. Field of the Invention

The present invention relates to a vehicle wheel with reduction in noise due to air column resonation (cavity resonation).

2. Description of the Related Art

A vehicle wheel with reduction in a noise level due to air column resonation (cavity resonation) is known.

Generally, the air column resonation generated in an air chamber of a tire (hereinafter referred to as tire air chamber) may generate road noise of a vehicle. The air column resonation is a phenomenon in which random vibrations of a tire caused by roughness of a road surface cause vibrations of the air in the tire air chamber. As a result, a resonation phenomenon occurs, which generates resonance.

JP 2004-90669 A discloses a vehicle wheel capable of reducing noise caused by the air column resonation. The vehicle wheel has a plurality of sub-air chambers in a circumferential direction of the rim. More specifically, a lid covers an annular space formed between a annular vertical wall vertically extending from a well and extends in the circumferential direction of the rim and a side wall of the well extending to a bead seat. A plurality of sub-air chambers are formed by sectioning the annular space, defined by the lid, the well, and vertical wall, with partition walls equi-distantly disposed in the circumferences of the rim. The tire air chamber is communicated with each sub-air chamber through communication holes formed in the lid. This vehicle wheel is capable of reducing the air column resonance in the tire air chamber by forming a Helmholtz resonator with the communication holes and the sub-air chambers.

However, there is a problem in this prior art vehicle wheel in mass production in consideration of securing air tightness and increase in manufacturing man-hour and manufacturing cost. This is because it is necessary to connect a plurality of partition walls and the lid to the wheel with the vertical wall extending vertically from the well by welding, adhering, and fitting with the air tightness being kept.

As a material of the members in the sub air chamber a metal, a plastic, etc. can be used. However, in consideration of weight reduction, mass productivity, air tightness in the sub air chambers a plastic, which allows blow molding, is preferable.

However, if a plastic is used as the material of the sub air chamber, a noise reduction performance cannot be obtained sufficiently as the Helmholtz resonator because a volume of the sub air chamber increases or decreases when variation in the air pressure varying alternately between plus and negative sides in the tire air chamber by the air column resonation because the wall members forming the sub air chambers has a lower plane stiffness than the case where a metal plate is used.

In this case, it can be considered to increase a thickness of the wall members in order to increase the plane stiffness. However, increase in the thickness of the wall members increases a weight of the sub air chambers, which results in increase in a magnitude of centrifugal force acting on the members of the sub air chamber. This results in increase in the strength of the members for fixing the sub air chamber to the well.

SUMMARY OF THE INVENTION

An aspect of the present invention provides a vehicle wheel of which mass productivity is increased.

Another aspect of the present invention provides a vehicle wheel having sub air chambers formed of wall members made of plastic which is capable of increasing a plane stiffness of the wall members forming the sub air chamber with increase in mass productivity and with suppression in increase in weight.

A first aspect of the present invention provides a wheel for a vehicle comprising:
 a disk and a rim which comprises a well, fixed to an outer circumference of the disk for supporting a tire for the vehicle;
 a sub air chamber member made of plastic on the well in a tire air chamber between the rim and the tire, the rim further comprising:
  a first vertical wall surface, having a first channel, extending from an outer circumferential surface of the well outwardly in a radial direction of the wheel and in a circumferential direction of the outer circumferential surface;
  a second vertical wall surface on the well, having a second channel, facing the first vertical wall surface, the sub air chamber comprising:
   a body including:
    a bottom plate on the side of the outer circumferential surface of the well;
    an upper plate, the bottom plate and the upper plate forming a sub air chamber therebetween; and
    a communication through hole for communicating the sub air chamber with the tire air chamber; and
   an edge part that connects the bottom plate to the upper plate and extends from the body toward the first and second vertical wall surfaces and is fitted into to be fixed by the first and second channels; wherein the upper plate curves so as to be apart from the outer circumferential surface of the well.

Differently from the vehicle wheel according to JP 2004-90669 A in which a plurality of partition walls and the lid are connected to the wheel at a high accuracy after arranging a plurality of partition walls and the lid on the wheel, this wheel can be produced only by fitting the sub air chamber members having sub air chambers between a first vertical wall and a second vertical wall formed in the well.

The upper plate which forms a body of the sub air chamber together with a bottom plate is so curved as to protrude in such a direction as to be away from an outer circumferential surface of the well. This suppresses expansion of the upper plate if the inner pressure in the sub air chamber increases, which suppresses variation in the volume of the sub air chamber.

A second aspect of the present invention provides a wheel for a wheel for a vehicle comprising:
 a disk and a rim which comprises a well, fixed to an outer circumference of the disk for supporting a tire for the vehicle;
 a sub air chamber member made of plastic on the well in a tire air chamber between the rim and the tire, the rim further comprising:
  a first vertical wall surface, having a first channel, extending from an outer circumferential surface of the well outwardly in a radial direction of the wheel and in a circumferential direction of the outer circumferential surface;

a second vertical wall surface on the well, having a second channel, facing the first vertical wall surface, the sub air chamber comprising:

a body including:

a bottom plate on the side of the outer circumferential surface of the well;

an upper plate, the bottom plate and the upper plate forming a sub air chamber therebetween; and a communication through hole for communicating the sub air chamber with the tire air chamber; and an edge part that connects the bottom plate to the upper plate and extends from the body toward the first and second vertical wall surfaces and is fitted into to be fixed by the first and second channels, wherein at least one of the upper plate and the bottom plate has a bead.

According to the second aspect of the present invention, at least one of the upper plate and the bottom plate which form the body has beads, which increases a plane stiffness. This suppresses inward or outward hollowing and expanding of the upper plate and the bottom plate to suppress variation in the volume of the sub air chamber.

A third aspect of the present invention provides a wheel based on the second aspect, wherein at least one of the upper plate and the bottom plate comprises a connecting part so as to be locally hollowed toward inside of the sub air chamber to partially connect the upper plate and the bottom plate.

According to the third aspect, a plane stiffness of at least one of the upper plate and the bottom plate is increased because of the formed beads. Further, a distance between the upper plate and the bottom plate is kept at a connecting part because at least one of the upper plate and the bottom plate comprises the connecting part so as to be locally hollowed toward inside of the sub air chamber to partially connect the upper plate and the bottom plate. This suppresses hollowing and protruding of the plate and a resultant variation in the volume of the sub air chamber, when the inner pressure of the sub air chamber varies.

A fourth aspect of the present invention provides a wheel for a vehicle comprising:

a disk and a rim which comprises a well, fixed to an outer circumference of the disk for supporting a tire for the vehicle;

a sub air chamber member made of plastic on the well in a tire air chamber between the rim and the tire, the rim further comprising:

a first vertical wall surface, having a first channel, extending from an outer circumferential surface of the well outwardly in a radial direction of the wheel and in a circumferential direction of the outer circumferential surface;

a second vertical wall surface on the well, having a second channel, facing the first vertical wall surface, the sub air chamber comprising:

a body including:

a bottom plate on the side of the outer circumferential surface of the well;

an upper plate, the bottom plate and the upper plate forming a sub air chamber therebetween;

a communication through hole for communicating the sub air chamber with the tire air chamber; and an edge part that connects the bottom plate to the upper plate and extends from the body toward the first and second vertical wall surfaces and is fitted into to be fixed by the first and second channels, wherein at least one of the upper plate and the bottom plate comprises a connecting part so as to be locally hollowed toward inside of the sub air chamber to partially connect the upper plate and the bottom plate.

According to the fourth aspect of the present invention, a distance between the upper plate and the bottom plate is kept and a sure connection is provided at the connecting part because at least one of the upper plate and the bottom plate comprises the connecting part so as to be locally hollowed toward inside of the sub air chamber to partially connect the upper plate and the bottom plate. This suppresses hollowing and protruding of the plate and a resultant variation in the volume of the sub air chamber.

According to the vehicle wheel may be superior in mass productivity in addition to less in the number of process and a manufacturing cost because the sub air chamber member, in which a sub air chamber is previously formed, is fitted between the first and second vertical wall surfaces provided on the well.

Further, this allows the sub air chamber to be formed with thick plates, although the sub air chamber is made of plastic with a reduced volume variation and a maintained noise reduction performance. This structure reduces weight of the body of the sub air chamber member and reduces a centrifugal force on the edge part for supporting the sub air chamber on the well. This can reduce a thickness of the edge part with a reduced weight of the sub air chamber member including the body and the edge part. This reduces the weight of the vehicle wheel with the sub air chamber.

A fifth aspect of the present invention provides a wheel for a wheel for a vehicle comprising:

a disk and a rim which comprises a well, fixed to an outer circumference of the disk for supporting a tire for the vehicle;

a sub air chamber member made of plastic on the well in a tire air chamber between the rim and the tire, the rim further comprising:

a first vertical wall surface, having a first channel, extending from an outer circumferential surface of the well outwardly in a radial direction of the wheel and in a circumferential direction of the outer circumferential surface;

a second vertical wall surface on the well, having a second channel, facing the first vertical wall surface, the sub air chamber comprising:

a body including:

a bottom plate on the side of the outer circumferential surface of the well;

an upper plate, the bottom plate and the upper plate forming a sub air chamber therebetween; and a communication through hole for communicating the sub air chamber with the tire air chamber; and an edge part that connects the bottom plate to the upper plate and extends from the body toward the first and second vertical wall surfaces and is fitted into to be fixed by the first and second channels, wherein at least one of the upper plate and the bottom plate comprises a bead extending in a direction, along the outer circumferential surface, which intersects the first and second vertical wall surfaces.

According to the fifth aspect of the present invention, the vehicle wheel may be superior in mass productivity in addition to less in the number of processes and in the manufacturing cost because the sub air chamber member, in which a sub air chamber is previously formed, is fitted between the first and second vertical wall surfaces provided on the well.

According to the present invention, the vehicle wheel may be superior in mass productivity in addition to less in the number of processes and in the manufacturing cost because the sub air chamber member, in which a sub air chamber is previously formed, is fitted between the first and second vertical wall surfaces provided on the well.

BRIEF DESCRIPTION OF THE DRAWINGS

The object and features of the present invention will become more readily apparent from the following detailed description taken in conjunction with the accompanying drawings in which:

FIG. 11A is a cross section of the sub air chamber member taken along line K-K in FIG. 10B;

FIG. 11B is a cross section of the sub air chamber member taken along line K-K in FIG. 10B;

FIG. 12 is a cross sectional view of a rim of the vehicle wheel according to a seventh embodiment;

FIG. 18 is a perspective view of the sub air chamber member according to the eleventh embodiment;

FIG. 28A is a plan view of the sub air chamber according to the sixteenth embodiment in which concavoconvex structure is formed on the bottom plate; and FIG. 28B is a cross sectional view taken along line XVb-XVb in FIG. 28A.

The same or corresponding elements or parts are designated with like references throughout the drawings.

DETAILED DESCRIPTION OF THE INVENTION

First Embodiment

With reference to drawings will be described a vehicle wheel of a first embodiment according to the present invention.

In the vehicle wheel of the first embodiment, sub air chamber members (Herm) are fixed to the wheel by fitting the sub air chamber members into channels on the side of the well 11c.

After describing a whole structure of the vehicle wheel, will be described a structure of the sub air chamber members.

Whole Structure of Vehicle Wheel

Figure 1:
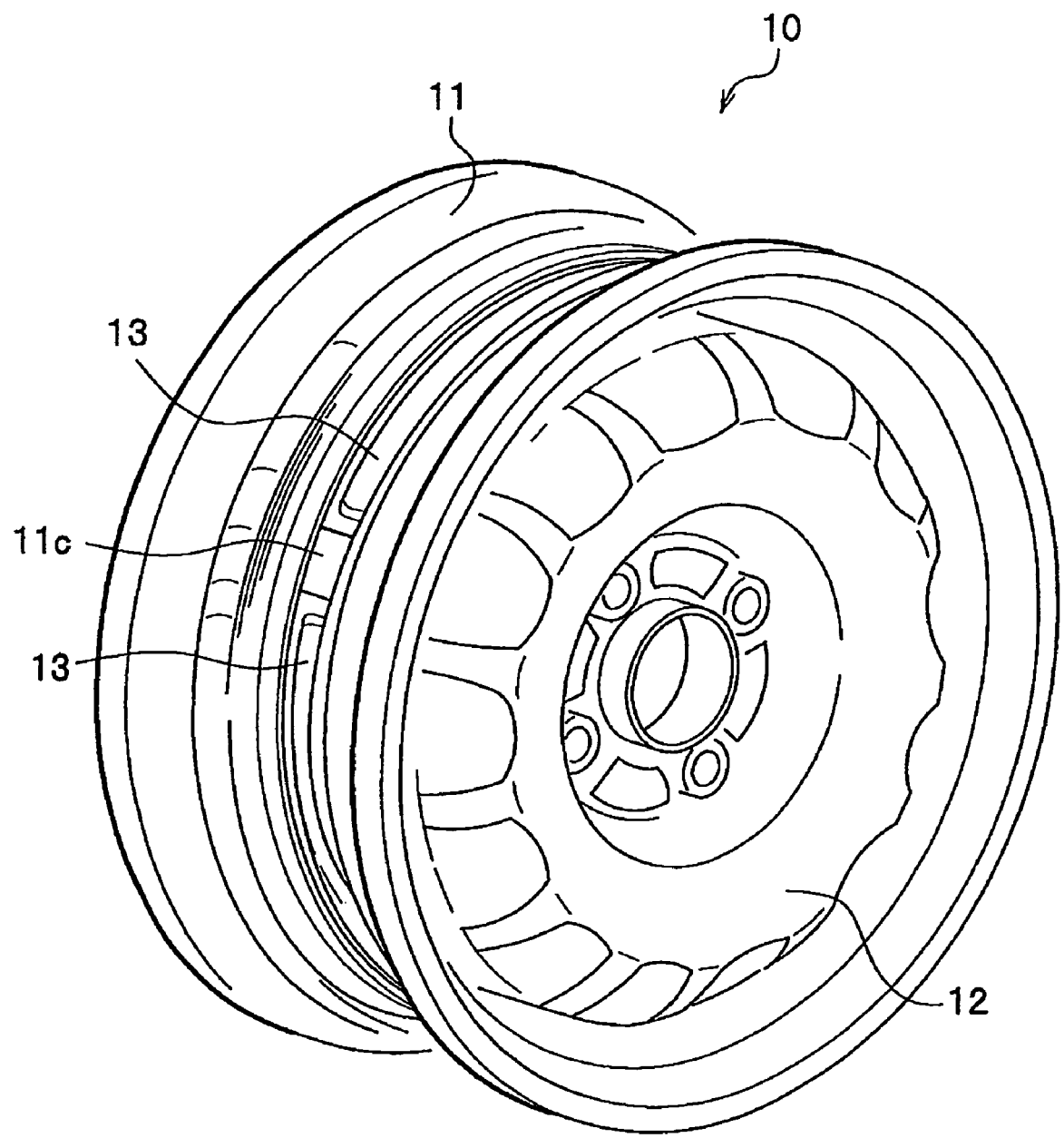
FIG. 1 is a perspective view of the vehicle wheel according to first to sixteenth embodiments.
Figure 2:
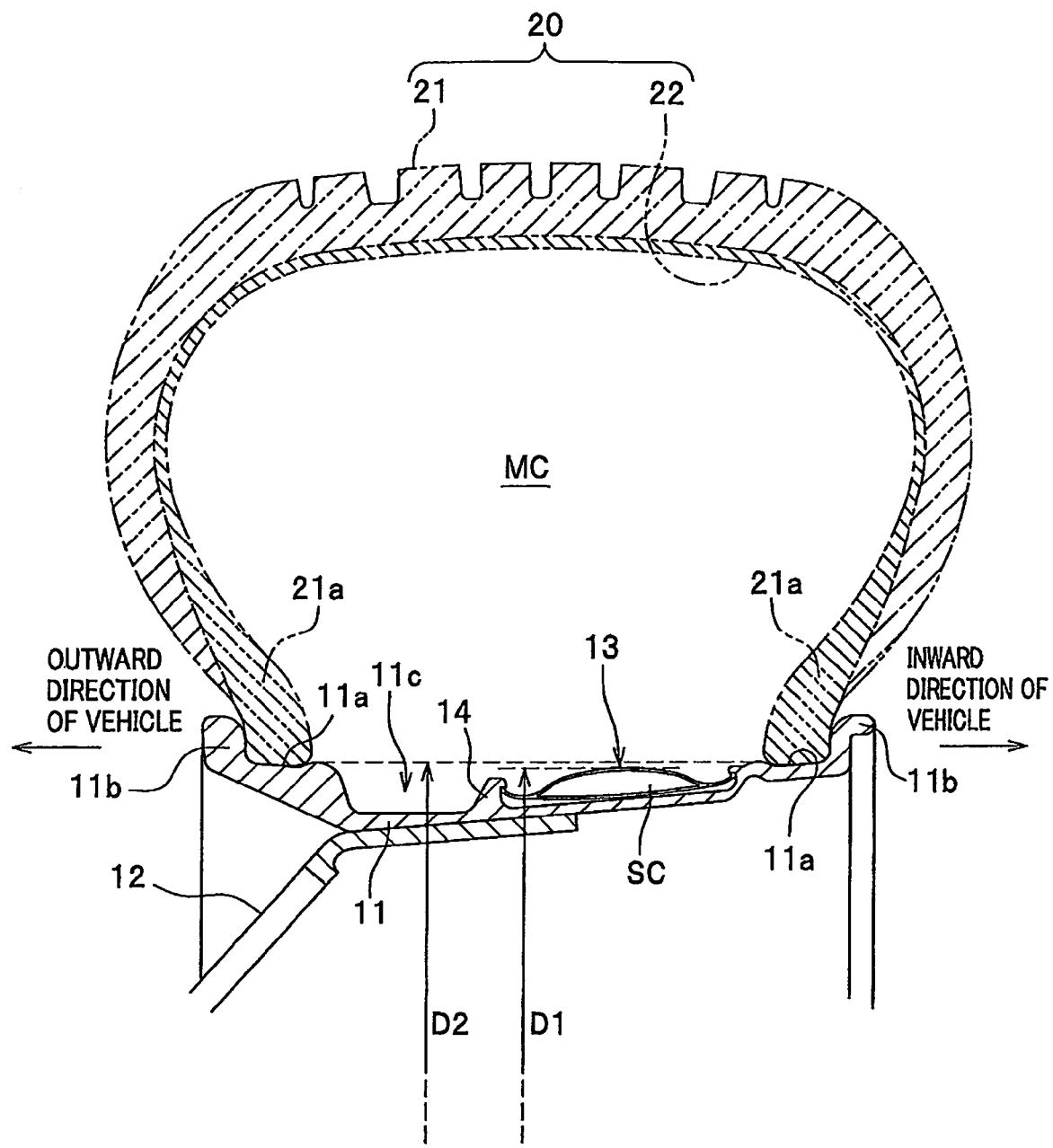
FIG. 2 is a sectional front view of a main part of the vehicle wheel on which a tire is put.
Figure 3:
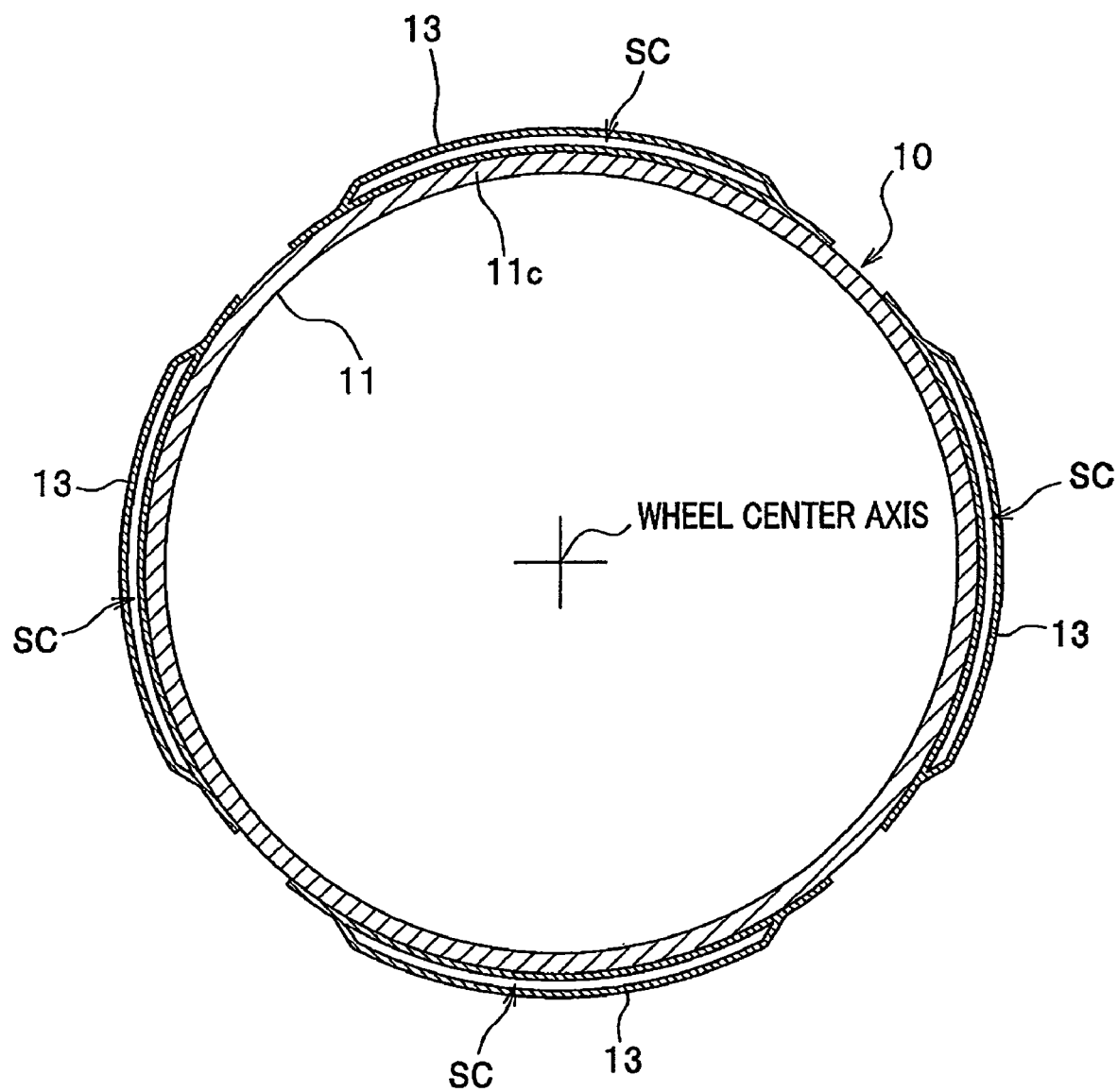
FIG. 3 is a side sectional view of the vehicle wheel to show locations where the sub air chambers are disposed.

With reference to FIGS. 1 to 3 (occasionally to FIG. 7A) will be described a whole structure of the vehicle wheel.

FIG. 1 is a perspective view of the vehicle wheel according to the first embodiment (also referred in second to sixteenth embodiments). FIG. 2 is a sectional front view of a main part of the vehicle wheel on which a tire is put. FIG. 3 is a side sectional view of the vehicle wheel to show locations where the sub air chambers are disposed.

As shown in FIG. 1, the vehicle wheel 10 includes a rim 11 for holding a tire 20 (see FIG. 2) put thereon, a disk 12 for connecting the rim 11 to a hub of a vehicle (not shown), and a sub air chamber 13 fixed to an outer circumferential surface 11d (see FIG. 7A) of the well 11c.

As shown in FIG. 2, the rim 11 includes bead seats 11a formed at edges, in a width direction, of the vehicle wheel 10, rim flanges 11b extending from the bead seats 11a and being bent outwardly in a radial direction of the vehicle wheel 10 in a form of letter "L", and the well 11c recessed in an inward radial direction of the vehicle wheel 10 between the bead seats 11a and 11a.

The tire 20 is put on the rim 11 with the beads 21a and 21a being seated on the bead seats 11a. This forms a tire air chamber MC which is an air-tight space having an annular shape between an outer circumferential surface 11d and an inner circumferential surface of the tire 20.

The tire 20 includes a tire body 21 and an inner liner 22.

The well 11c is provided to allow the beads 21a of the tire 20 to fall therein when the tire 20 is put on the rim 11. Formed on the outer circumferential surface 11d (see FIG. 7A) is a vertical wall 14.

As shown in FIG. 2, from the edge, in an outward direction from the vehicle, of the rim 11, the disk 12 extends inwardly in the radial direction of the vehicle wheel 10. The rim 11 and the disk 12 are manufactured, for example, from a light weight high strength material such as an aluminum alloy and a magnesium alloy.

However, the material of the disk 12 is not limited to the aluminum alloy and the magnesium alloy, but may be formed with steel or the like. Further, the vehicle wheel 10 may be a spoke wheel.

As shown in FIG. 3, four sub air chambers are disposed along a circumferential direction of the wheel on the well 11c. The sub air chamber members 13 are a long member extending in the circumferential direction of the wheel 10 and have a sub air chamber SC. In the first embodiment, four sub air chamber members are disposed along the circumferential surface of the well 11c equi-distantly. In other words, the vehicle wheel 10 of the first embodiment has two pairs of sub air chamber members 13, each pair of sub air chamber members facing each other across a wheel rotation center axis of the vehicle wheel 10. The sub air chamber member is shown in FIGS. 1 to 3 with a simple reference of "13". However, the sub air chamber member 13 is shown as a respective element. More specifically, the sub air chamber member comprises sub air chamber 13A which is an example of the first embodiment and sub air chamber members 13B, 13B', 13C, 13D, and 13E which are modifications.

Sub Air Chamber Member

With reference to FIGS. 4 to 7 (occasionally FIG. 2) will be described the sub air chamber members 13.

Figure 4:
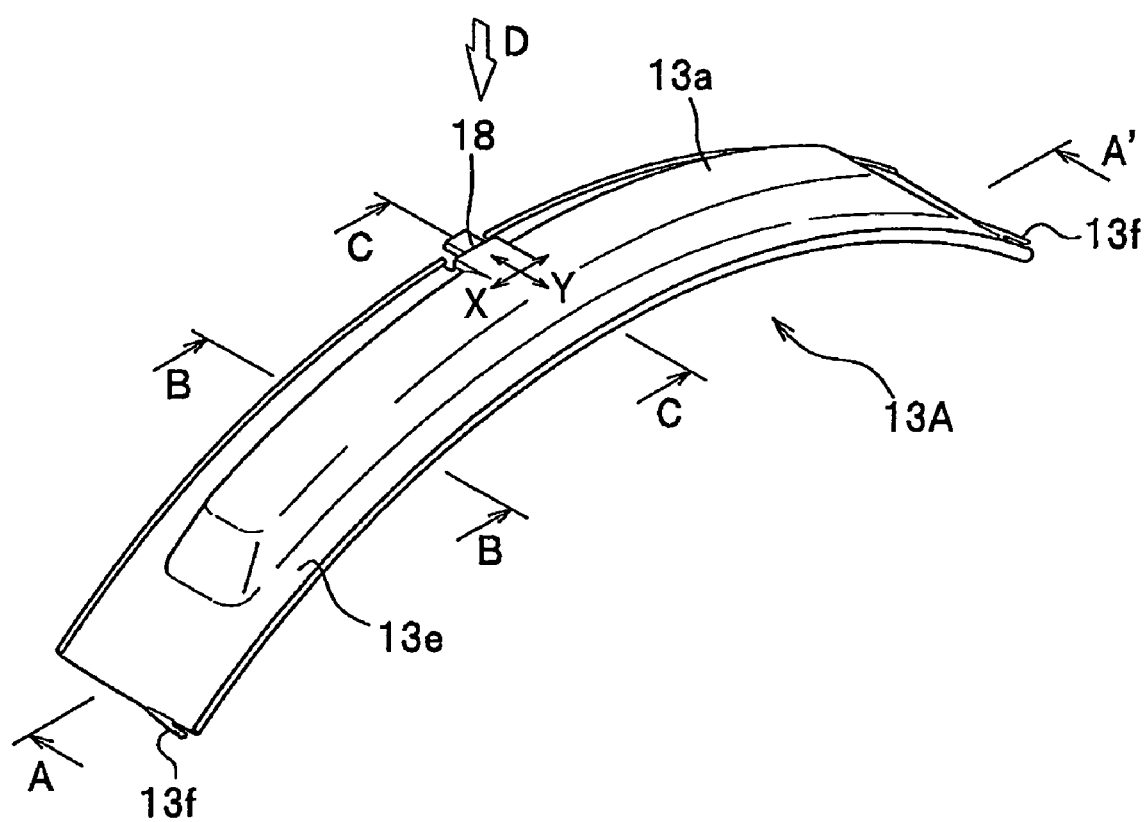
FIG. 4 is a perspective view of the sub air chamber member according to the first embodiment.
Figure 5:
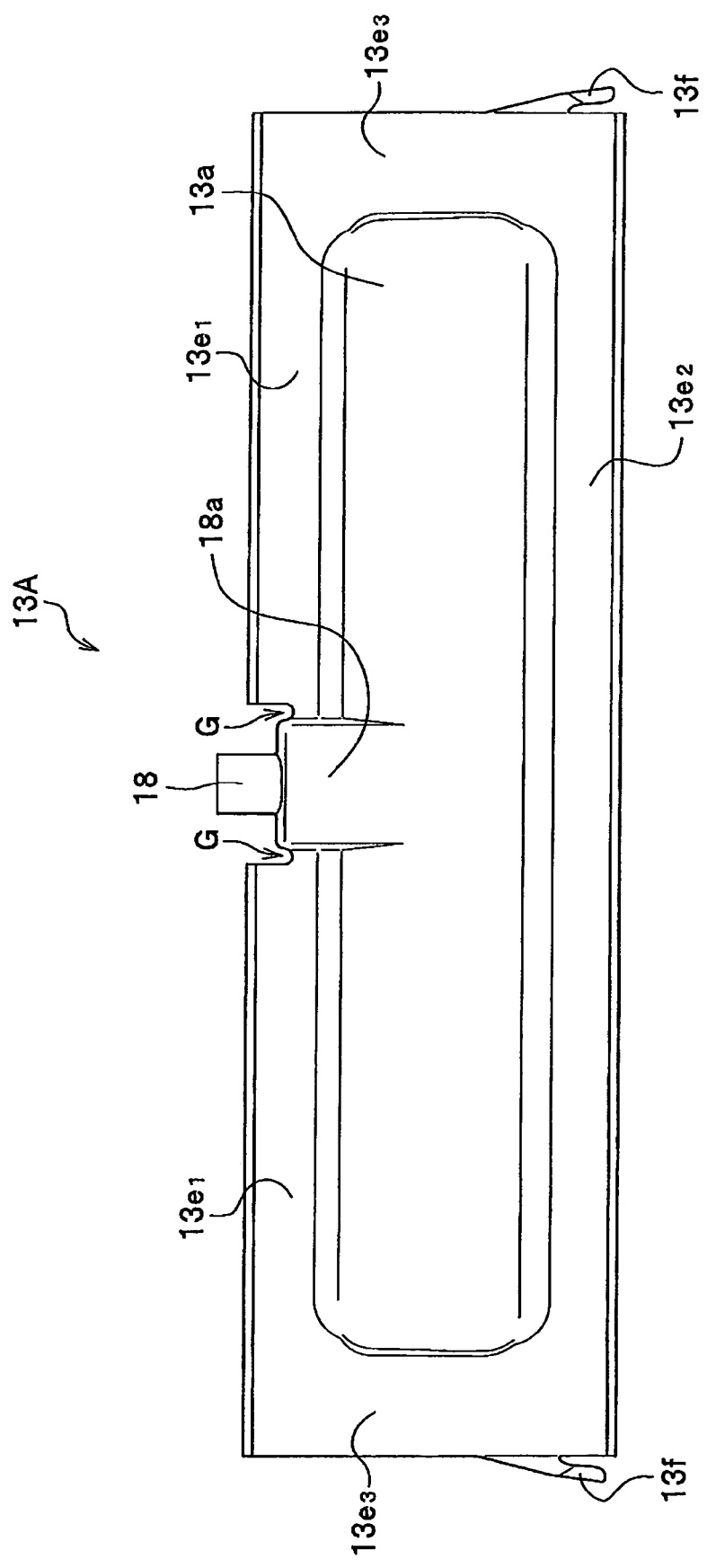
FIG. 5 is a plan view of the sub air chamber member viewed from D in FIG. 4 in a spread condition, which is originally curved in the circumferential direction of the wheel.
Figure 6A:
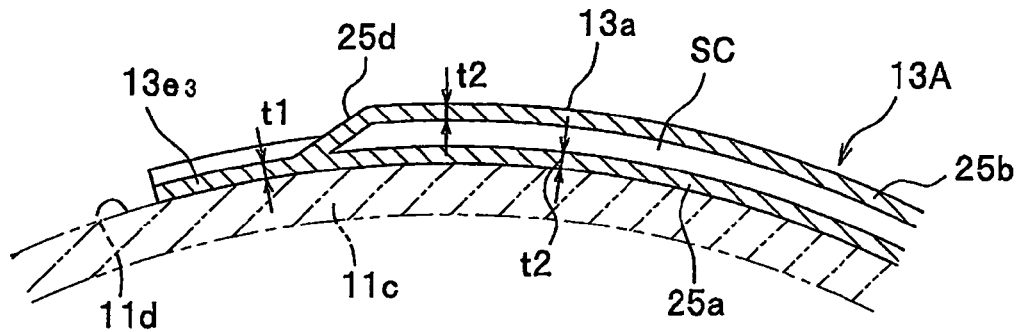
FIG. 6A is a cross sectional view, taken along A-A' in FIG. 4, showing a part on the side of "A" in FIG. 4.
Figure 6B:
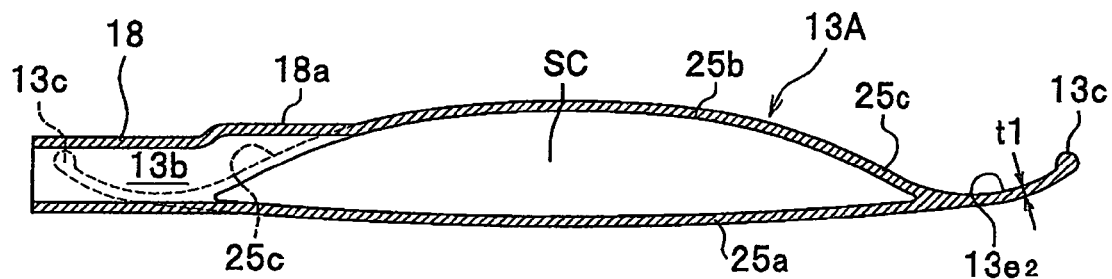
FIG. 6B is a cross sectional view, taken along B-B' in FIG. 4.
Figure 6C:
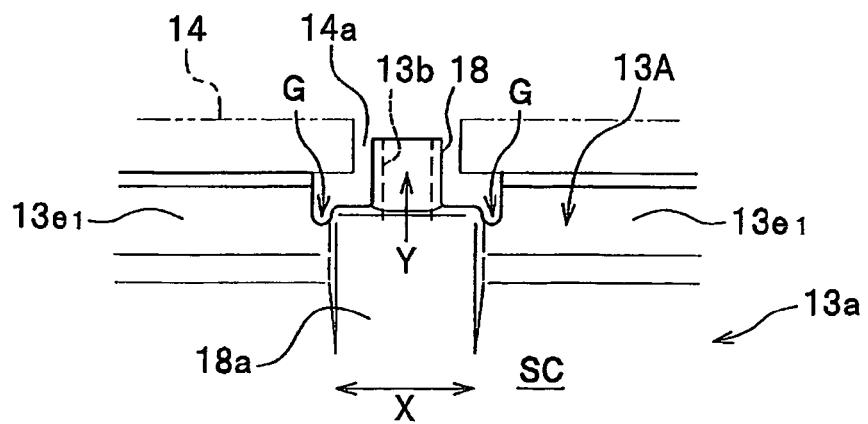
FIG. 6C is a partial plan view of a protruding part, viewed in a direction D in FIG. 4.
Figures 7A, 7B:
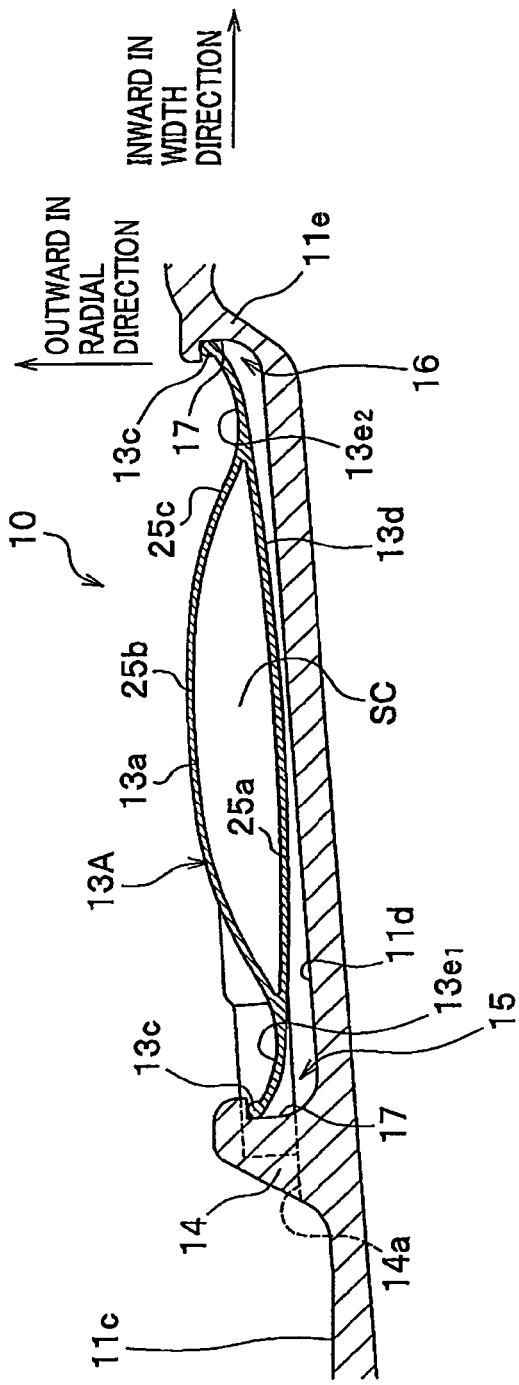
FIG. 7A is an enlarged cross sectional view of a part of the well to which the sub air chamber member is fixed.
FIG. 7B is a perspective view of a notch formed in the vertical wall of the well.

FIG. 4 is a perspective view of the sub air chamber member according to the first embodiment, and FIG. 5 is a plan view of the sub air chamber member viewed from D in FIG. 4 in an unfolded condition, which is originally curved in the circumferential direction of the wheel 10. FIG. 6A is a cross sectional view, taken along A-A' in FIG. 4, showing a part on the side of A in FIG. 4, and FIG. 6B is a cross sectional view, taken along B-B' in FIG. 4, and FIG. 6C is a partial plan view of a protruding part 1, viewed in a direction D in FIG. 4. FIG. 7A is an enlarged cross sectional view of a part of the well 11c to which the sub air chamber member is fixed, and FIG. 7B is a perspective view of a notch formed in the vertical wall of the well 11c.

The sub air chamber members 13A are, as shown in FIGS. 4 and 6A, bent in a longitudinal direction thereof along the outer circumferential surface 11d of the well 11c.

The sub air chamber member 13A includes the body 13a in which the sub air chamber SC is formed between the bottom plate 25a (see FIG. 6A) and the upper plate 25b (see FIG. 6A) and an edge part 13e (see FIG. 4) outwardly extending from the body 13a. The edge part 13e is also provided both in the circumferential direction of the vehicle wheel 10 and the width direction of the vehicle wheel from the body 13a.

As shown in FIG. 5, out of the edge part 13e, a part extending in the circumferential direction of the wheel 10 and having the protruding part 18 is referred to as an edge part 13e1, another part opposite thereto in the width direction of the wheel 10 is referred to as an edge part 13e2, and further parts extending in the width direction of the wheel 10 is referred to as edge parts 13e3. When it is not necessary to specify which part of the edge parts is referred, it is simply referred to as the edge part 13e.

As shown in FIG. 6A, the edge part 13e has the same thickness t1 as a thickness t2 of the bottom plate 25a and the upper plate 25b of the body 13a. The edge part 13e of the edge parts 13e2 have the edges 13c and 13c in the width direction of the vehicle wheel 10, the edge 13c having a thickness greater than the thickness t1 and extends in the circumferential direction of the vehicle wheel 10 with a circle section.

Further, the edge parts 13e in the first embodiment have a predetermined spring constant by suitably determining the thickness t1 and a material.

As shown in FIG. 5, provided to edges in the circumferential direction of the wheel on the side of the edge part 13e2 are temporary fixing tacks 13f extending from the edge parts 13e3 and being bent slantwise so as to extend in the width direction of the wheel 10 in which planes of the tips of the temporary fixing tacks 13f extend along the width direction of the wheel 10.

As shown in FIG. 6A, out of the upper plate 25b of the body 13a which is one of the wall members enclosing the sub air chamber SC end parts 25d at ends of the upper plate 25 in the circumferential direction of the wheel 10 are formed slantwise at ends thereof in the circumferential direction of the wheel 10. Further, as shown in FIG. 6B, the upper plate 25b of the body 13a which is one of the of the wall members enclosing the sub air chamber SC has end parts in the width direction of the wheel 10 which are side plates 25c and 25c formed slantwise to the width direction of the wheel 10. A part of the upper plate 25b between the side plates 25c and 25c more curves outwardly in the radial direction of the wheel 10 than the bottom plate 25a curving inwardly in the radial direction of the wheel 10. In other words, the upper plate 25b curves so as to protrude in an away direction from the outer circumferential surface of the well 11c.

With reference to FIG. 7A showing a cross sectional view of the sub air chamber member 13A taken along B-B in FIG.

4, the sub air chamber member 13A is fit between the first vertical wall surface 15 and the second wall surface 16 to be fixed on the outer circumferential surface lid of the well 11c. More specifically, the edge parts 13e1 extend toward the first vertical wall surface 15 and the second vertical wall surface 16 to be fitted into the channels 17 and as shown in FIG. 6A extend in the circumferential direction of the vehicle wheel 10 along the outer circumferential surface 11d of the well 11c from the body 13a.

Further, as shown in FIG. 7A, the edge parts 13e1 and 13e2 extend from the body 13a toward first vertical wall surface 15 and the second vertical wall surface 16 with the edges 13c and 13c which are fitted into the channels 17, as shown in FIG. 3A, so that the sub air chamber member 13A is fixed by the first vertical wall surface 15 and the second vertical wall surface 16.

As shown in FIG. 7A, the bottom plate 25a which is a part of the body 13a on the side of the outer circumferential surface 11d and the edge parts 13e1 and 13e2 extending from the bottom plate 25a are integrally curved such that the sub air chamber member 13A is formed to be protrude toward the outer circumferential surface 11d of the well 11c between the both edges 13c and 13c.

When a centrifugal force due to rotation of the vehicle wheel 10 acts on the sub air chamber 13A as described later, the curve part 13d bends in such a direction that the curve part 13d protrudes outwardly in the radial direction of the vehicle wheel 10. This increases pressure forces on the both edges 13c and 13c contacting the first vertical wall surface 15 and the second vertical wall surface 16. Thus, the sub air chamber member 13A is firmly fixed to the vehicle wheel 10 as increase in the centrifugal force as mentioned later.

First and Second Vertical Wall Surfaces

The vertical wall 14 is formed such that a first vertical wall surface 15 extends from the outer circumferential surface 11d of the well 11c outwardly in a radial direction of the vehicle wheel 10. The vertical wall 14 further extends on the outer circumferential surface 11d in a circumferential direction of the vehicle wheel 10 and forms an annular shape when viewed from the side of the vehicle wheel 10. On a side surface part 11e formed at a location on the well 11c inward in width direction of the wheel 10 (on the side of the vehicle), a second vertical wall 16 facing the first vertical wall surface 15 is formed.

The vertical wall 14 can be formed integrally with the well 11c during casting the rim 11.

These first vertical wall surface 15 and the second vertical wall surface 16 have channels 17, respectively. These channels 17 provide annular recesses and openings extending along the circumferential direction of the wheel 10 on the outer circumferential surface 11d of the well 11c. The openings face each other. Fitted into these channels 17 are edge parts 13e of the sub air chamber member 13A.

The channels 17 are formed by machining the vertical wall 14 and the side surface part 11e, respectively.

Formed in the vertical wall 14 is a notch 14a as shown in FIGS. 7A and 7B. Fitted into the notch 14a is a protruding part (pipe) 18 of the sub air chamber material 13A. The protruding part 18 will be described later.

The notch 14a is formed together with the vertical wall 14 at the same time by casting the rim 11 or machining the vertical wall 14.

As shown in 7A, a body 13a of the air chamber member 13A is air-tightly formed to provide the sub air chambers SC. The body 13a includes the bottom plate 25a, the upper plate 25b (the side plates 25c and 25c (see FIG. 6B) at side edges of the sub air chamber member 13A in the width direction of the vehicle wheel 10, and the end plates 25d and 25d at ends, in the circumferential direction of the vehicle wheel 10, of the sub air chamber member 13A (see FIG. 6B).

Protruding Part

With reference to FIG. 4 to FIG. 7B will be described the protruding part 18.

As shown in FIGS. 4 and 5, the sub air chamber member 13A has the protruding part 18 protruding from the body 13a in a direction Y (orthogonal to a rotation direction X of the vehicle wheel 10 in the first embodiment).

In addition, as shown in FIG. 5, gaps G are formed between the protruding part 18 and the edge parts 13e.

As shown in FIG. 6C, the protruding part 18 extends to a side of the vertical wall 14 and is fitted into the notch 14a formed in the vertical wall 14.

The gaps G and G are provided to allow the edge parts 13e to be deformed, while the protruding part 18 is fitted into the notch 14a, in order to assist the edge parts 13e fitting into the channel 17 of the first vertical wall surface 15.

The gaps G and G are provided to allow the edge parts 13e1 to be deformed, while the edge parts 13e1 are deformed by a centrifugal force to prevent parts between a root 18a and the edge parts e1 from fatigue crack.

The protruding part 18 comprises a pipe P having a communication through hole 13b therein for providing communication between the sub air chamber SC and the tire air chamber MC (see FIG. 2).

A shape of the sub air chamber SC formed in the sub air chamber member 13A is not limited. However, a flat shape in a cross section is preferable. Thus, the sub air chamber SC according to the first embodiment has, as shown in FIG. 6B, a substantially rectangular of which dimension in the radial direction at the well 11c is shorter (thinner) than that in the width direction of the wheel 10.

In the first embodiment, in the sub air chamber member 13A, a maximum radius D1 from the wheel rotation center axis to an outer surface of the sub air chamber member 13A in the wheel radial direction is set to be shorter than a radius D2 from the wheel rotation center axis to the bead seats 11a. This facilitates putting the tire 20 on the vehicle wheel 10.

A material of the sub air chambers 13A is a general material used for industrial products such as metal, plastic, and rubber. Further, in consideration of reduction in weight, increase in mass productivity, reduction in manufacturing cost in the sub air chamber member 13A, and keeping air-tightening the sub air chamber SC, a material having a light weight and high stiffness and allowing a blow molding is preferable. Particularly, polypropylene is preferable because of high resistance to repeated bending fatigue.

Preferably, a volume of the sub air chamber SC in the sub air chamber member 13A is approximately from 50 to 250 cc. Setting the volume of the sub air chamber SC within this range (approximately from 50 to 250 cc) allows the sub air chamber member 13A to provide a sufficient noise reduction effect with suppression of increase in weight, which provides reduction in weight of the vehicle wheel 10.

A total length of the sub air chamber members 13A in the circumferential direction of the vehicle wheel 10 can be appropriately determined in consideration of a mass distribution adjustment and easiness in assembling the sub air chamber members 13A into the well 11c, wherein a circumferential length of the rim 11 is a maximum total length of the sub air chamber members 13A.

Length in Communication Through Hole

A cross sectional shape of the communication through hole 113b is not limited. In the first embodiment, the cross sectional shape is a circle, but may be any of an oval, a polygon, or a half circle. If the cross sectional shape is a circle, it is preferable that a diameter of the circle is equal to or grater than 5 mm. If the cross sectional shape of the communication through hole 13*b* is other than the circle, it is preferable that the cross sectional area is that of the circle having a diameter equal to or greater than 5 mm.

A length of the communication through hole 113*b* is determined to satisfy Eq. (1) which determines a resonance frequency of a Helmholtz resonator.

$$f0 = C/2\pi \times \sqrt{(S/V(L+\alpha \times \sqrt{S}))} \quad (1)$$

where f0 (Hz): resonance frequency; C(m/s): a sound velocity in the sub air chamber (=sound velocity in the tire air chamber MC); V(m³): a volume of the sub air chamber SC; L(m): a length of the communication through hole 113*b*; S(m²): a cross sectional area of an opening of the communication through hole 113*b*; and a: a correction coefficient.

The resonance frequency f0 can be adjusted to that of the tire air chamber MC. In this process, all resonance frequencies f0 of three sub air chamber members 13A shown in FIG. 3 can be set to the same value or different values. More specifically, if the tire air chambers MC has two resonance frequencies f1 and f2, the resonance frequency f0 of three sub air chamber members 13A can be set to be (f1+f2)/2.

Further, the resonance frequencies f0 of a pair of sub air chamber members 13A opposite each other about the wheel rotation center axis can be set to a frequency f1 and a resonance frequency f0 of the other pair of sub air chamber 13 can be set to be the frequency f2.

Figure 8A:
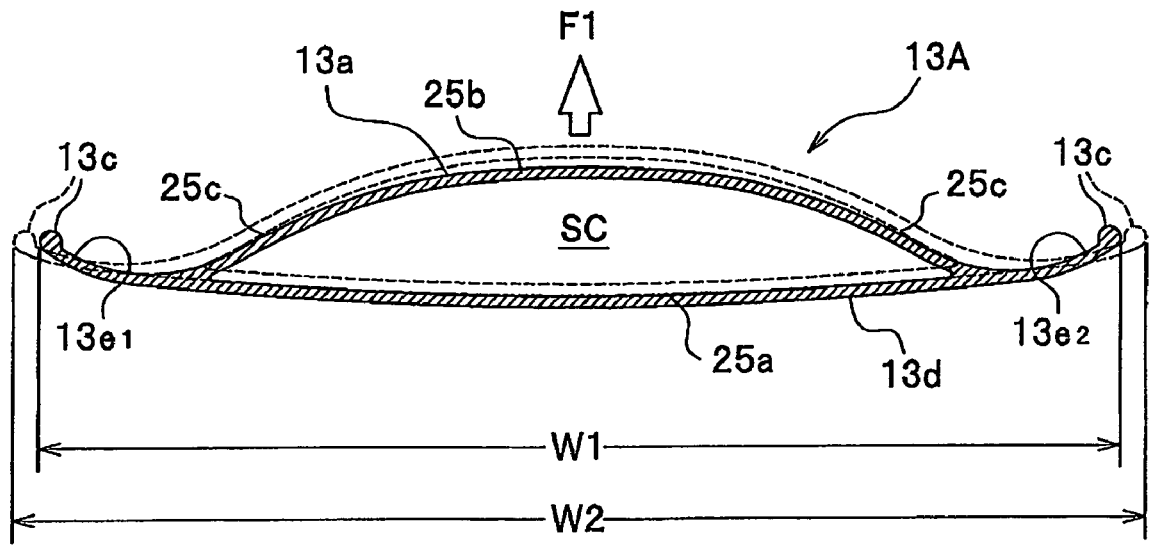
FIG. 8A is a cross sectional view, taken along ling B-B in FIG. 4, showing behavior of the sub air chamber member when a centrifugal force is applied thereto.
Figure 8B:
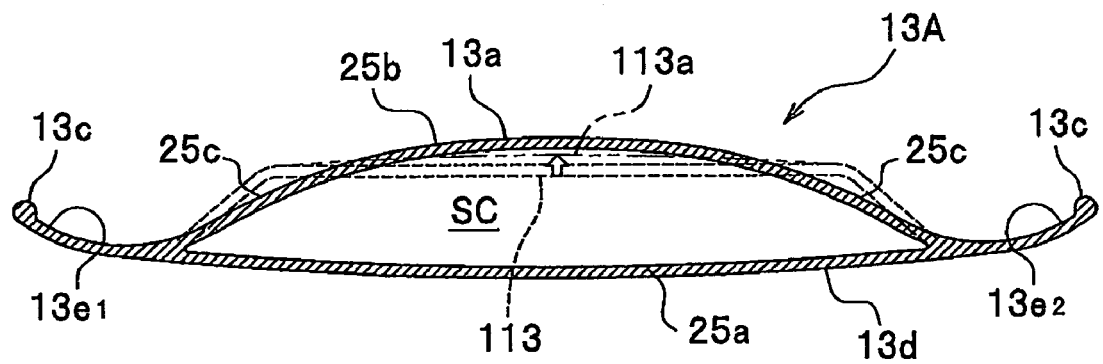
FIG. 8B is a cross sectional view of a comparison example and the sub air chamber member according to the first embodiment for comparison therebetween in a condition where an internal pressure in the sub air chamber increases.

With reference to FIGS. 8A and 8B (occasionally, FIGS. 2, and 4 to 6C) will be described operation of the vehicle wheel 10.

FIG. 8A is a cross sectional view, taken along ling B-B in FIG. 4, showing behavior of the sub air chamber member when a centrifugal force is applied thereto, and FIG. 8B is a cross sectional view of a comparison example and the sub air chamber member according to the first embodiment for comparison therebetween in a condition where an internal pressure in the sub air chamber increases.

The vehicle wheel 10 is manufactured only by fitting the sub air chamber members 13A into the rim 11 (well 11*c*) unlike in prior art disclosed in JP 2004-90669 A, in which the sub air chambers are formed by successively connecting a plurality of partition walls or lid members precisely, and connected members are assembled into a rim of a conventional vehicle wheel. Thus, the vehicle wheel 10 can decrease the number of processes and a manufacturing cost as compared with the prior art wheel disclosed in JP 2004-90669 A. Further, the vehicle wheel 10 provides stable noise reduction because no special attention is unnecessary for keeping air tightness of the sub air chambers SC unlike the prior art vehicle wheel disclosed in JP 2004-90669 A.

In the vehicle wheel 10 of the first embodiment, because the resonance frequency of the sub air chamber member 13A can be checked and corrected before the sub air chamber members 13A are fitted into the rim 11, the number of defective products of the vehicle wheel 10 can be decreased.

Further, in the vehicle wheel 10, when the sub air chamber members 13A are fixed to the rim 11 (the well 11*c*), as shown in FIG. 7A, the protruding part 18 of the sub air chamber member 13A (see FIG. 7B) is fitted into the notch 14*a*. The edge 13*c* on the side of the end part 13*e*1 is fitted into the channel 17 of the protruding part 18 of the sub air chamber 13A. Next, tips of the temporary fixing tacks 13*f* are fitted into the channel 17 of the second vertical wall surface 16 for temporary fixing the body 13*a*. Further, the edge parts 13*e*2 are pushed down inwardly in the radial direction of the wheel 10 by a mechanical force with a pushing down jig (not shown) having a curved surface corresponding to the outer circumferential surface 11*d* to fit the end 13*c* of the edge part 13*e*2 into the channel 17 of the second vertical wall surface 16.

Pushing down the edge part 13*e*2 provides a perfect fitting condition of the edge part 13*e*1 in addition to the edge part 13*e*2. In this process, because the edge parts 13*e*1 and 13*e*2 have a sufficient spring elasticity (spring constant), the sub air chamber member 13A is easily fixed to the rim 11 between the first vertical wall surface 15 and the second vertical wall surface 16.

Further, in this vehicle wheel 10, because, as shown in FIG. 7B, the protruding part 18 of the sub air chamber member 13A which protrudes in a direction Y orthogonal with the rotation direction X of the wheel 10 is fitted into the notch 14*a*. This surely prevents the sub air chamber members 13A from moving in the rotation direction X when the vehicle wheel 10 rotates.

Formed inside the protruding part 18 is the communication through hole 13*b*. This eliminates necessity of a part for forming the communication through hole in addition to the protruding part 18. Thus, the vehicle wheel 10 is reduced in weight because the vehicle wheel 10 is simplified in structure.

Further, in the vehicle wheel 10, when a centrifugal force is applied to the sub air chamber member 13A due to rotation, the curve part 13*d* which protruded toward the outer circumferential surface 11*d* of the rim 11 before rotation begins to reversely protrude outwardly in the radial direction of the vehicle wheel.

As shown in FIG. 8A, upon rotation of the wheel 10 a centrifugal force F1 is applied to the curve part 13*d* which protrudes in a direction opposite to a direction of the centrifugal force F1 (centrifugal direction), that is, applied to the sub air chamber 13A having the curve part 13*d* which protrudes toward the outer circumferential surface 11*d* shown in FIG. 7A. During this, the sub air chamber member 13A of which both edges 13*c* and 13*c* are restricted in movement in the centrifugal direction by the channels 17 expands at the curve part 13*d* in the width direction Z of the vehicle wheel because the curve part 13*d* is reversely bent, i.e., bent outward in the radial direction of the vehicle wheel 10. As a result, when the centrifugal force F1 is applied, a span W2 between both edges 13*c* and 13*c* in the sub air chamber member 13A (denoted by broken lines) becomes greater than a span W1 between both edges 13*c* and 13*c* in the sub air chamber member 13A before the centrifugal force F1 is applied as indicated with broken lines.

Next, as shown in FIG. 7A, on both edges 13*c*, which are restricted in movement in the width direction Z of the vehicle wheel 10 at the well 11*c* by the vertical wall 14 and the side surface part 11*e*, a pressing force F2 is increased on the vertical wall 14 and the side surface part 11*e*. In other words, in the vehicle wheel 10, pressing forces F2 on the first veridical wall surface 15 and the second vertical wall surface 16 by the both edges 13*c* and 13*c* increase, so that the sub air chamber member 13A is further securely fixed to the well 11*c*.

FIG. 8B shows a comparison example considered by the inventors in which the upper plate of the body 13A has two corners in a cross section. Thus, the upper plate of the body 13A of the comparison example tends to be expanded upwardly in the radial direction of the wheel as shown by an imaginary line with two-dot chain line. On the other hand, because the upper plate 25*b*, having no corners, hardly expands outwardly in the radial direction of the wheel 10. As a result, although there is a variation in air pressure in the tire air chamber MC (see FIG. 2), a volume of the sub air chamber SC hardly varies. Thus, the sub air chamber serves as the Helmholtz resonator, which efficiently reduces air column resonance. Accordingly, when there is a variation in air pressure in the tire air chamber MC (see FIG. 2) with a thickness of the upper plate 25b forming the sub air chamber SC being kept thin, a variation in the volume of the sub air chamber SC can be made smaller than the sub air chamber member 113 of the comparison example. This allows the sub air chamber SC to serve as the Helmholtz resonator, which efficiently reduces air column resonance.

This structure reduces a weight of the body 13a of the sub air chamber member 13A. Accordingly, a thickness of the edges 13e supporting the sub air chamber member 13A against the centrifugal force can be made smaller by the reduced weight of the body 13a. Thus, the vehicle wheel 10 to which the sub air chamber members 13A are fixed can be reduced in weight.

Further, in the vehicle wheel 10, as shown in FIG. 2, the maximum diameter D1 passing through the wheel rotation center axis to the outmost side in the radial direction of the vehicle wheel is determined to be smaller than the diameter D2 passing through the wheel rotation center axis to the bead seats 11a. This decreases a possibility in that a tool such as a lever or a tire 20 (beads 21a or the like) contacts the sub air chamber member 13A. As a result, a performance of putting the tire 20 increases.

Further, in the vehicle wheel 10, the sub air chamber SC has a flat shape in cross section, which suppresses the maximum diameter D1 passing through the wheel rotation center axis of the vehicle wheel 10 with a sufficient predetermined volume of the sub air chamber SC being provided.

Modification of Sub Air Chamber

The present invention is not limited to the first embodiment, but may be modified. In the below description of the modification of the vehicle wheel, the same parts are designated with the same references as those in the first embodiment, and thus a duplicated description will be omitted.

In the first embodiment, to form the sub air chamber member with a low variation in volume of the sub air chamber SC when the air pressure in the tire air chamber MC varies, shapes in cross section of the bottom plate 25a and upper plate 25b as walls of the body 13a forming the sub air chamber SC are made that the bottom plate 25a is slightly curved outwardly (inwardly in the radial direction of the wheel 10), and the upper plate 25b is more strongly curved outwardly (outwardly in the radial direction of the wheel 10) than the bottom plate 25b. However, the present invention is not limited to the first embodiment.

Second Embodiment (First Modification of Sub Air Chamber)

Figure 9A:
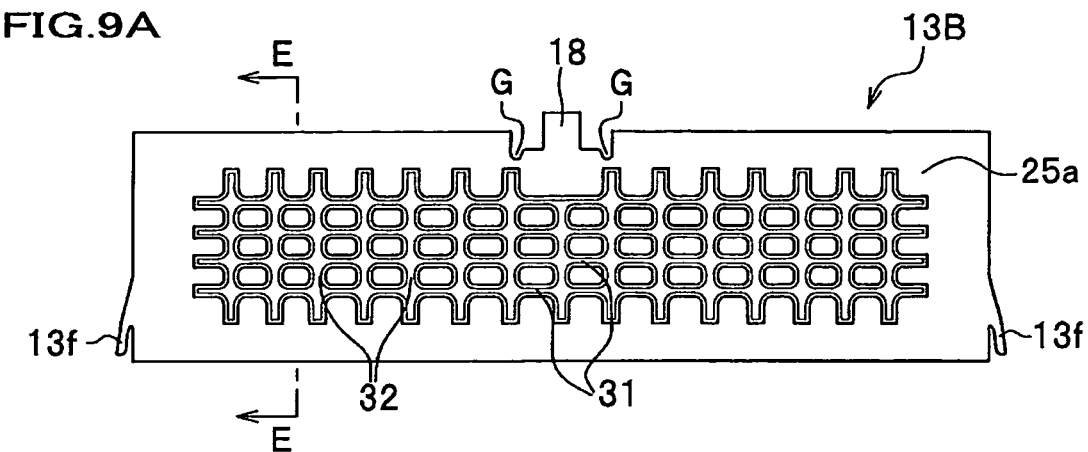
FIG. 9A is a plan view of a sub air chamber according to the second embodiment which is spread and viewed from the inside of the wheel in the radial direction of the wheel.
Figure 9B:
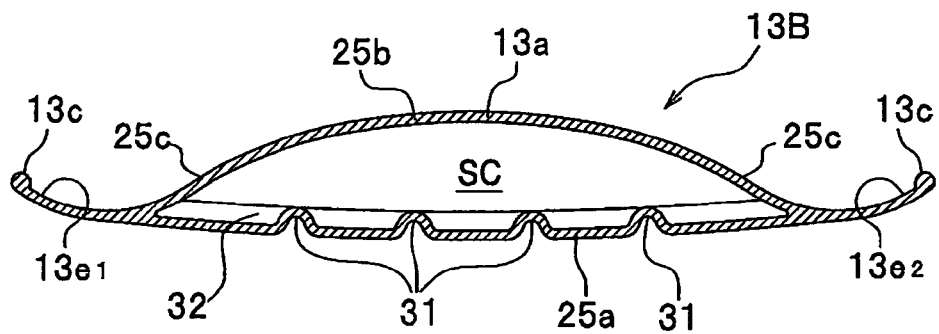
FIG. 9B is a cross section of the sub air chamber member, taken along line E-E in FIG. 9A.

FIG. 9A is a plan view of a sub air chamber according to the second embodiment which is spread and viewed from the inside of the wheel in the radial direction of the wheel 10, and FIG. 9B is a cross section of the sub air chamber member, taken along line E-E in FIG. 9A.

The sub air chamber member 13B as the first modification of the sub air chamber member includes a bottom plate 25a having a plurality of, for example, four, longitudinal beads (channels, folds) 31 by forming depressions in the bottom plate 25a of the sub air chamber member 13A which are hollowed toward the sub air chamber SC and extend in the circumferential direction of the wheel 10 and having a plurality of, for example, fifteen, lateral beads (channels, folds) 32 by forming depressions in the bottom plate 25a of the sub air chamber member 13A which are hollowed toward the sub air chamber SC and extend in the width direction of the wheel 10.

Forming the longitudinal beads 31 and lateral beads 32 on the bottom plate 25a which is curved to have a slight protrusion in the radial direction of the wheel 10 is formed. This suppresses expansion of the bottom plate 25a inwardly in the radial direction of the wheel 10 in the sub air chamber member 13B when the air pressure in the sub air chamber SC increases.

Particularly, when the air pressure in the sub air chamber SC increases, the bottom plate 25a outwardly curved with a low curvature tends to be bent outwardly. However, the bottom plate 25a, having the longitudinal and lateral beads 31 and 32 can more suppress outward expansion than the case of the sub air chamber member 13A.

Accordingly, when there is a variation in air pressure in the tire air chamber MC (see FIG. 2) in a case where a thickness of the upper plate 25b forming the sub air chamber SC being kept thin, a variation in the volume of the sub air chamber SC can be made smaller than the sub air chamber member 13A. This allows the sub air chamber SC to serve as the Helmholtz resonator, which efficiently reduces air column resonance.

This structure reduces a weight of the body 13a of the sub air chamber member 13B. Accordingly, a thickness of the edges 13e supporting the sub air chamber member 13B against the centrifugal force can be made smaller by the reduced weight of the body 13a. Thus, the vehicle wheel 10 to which the sub air chamber members 13B are fixed can be reduced in weight.

Third Embodiment (Second Modification of Sub Air Chamber)

Figure 9C:
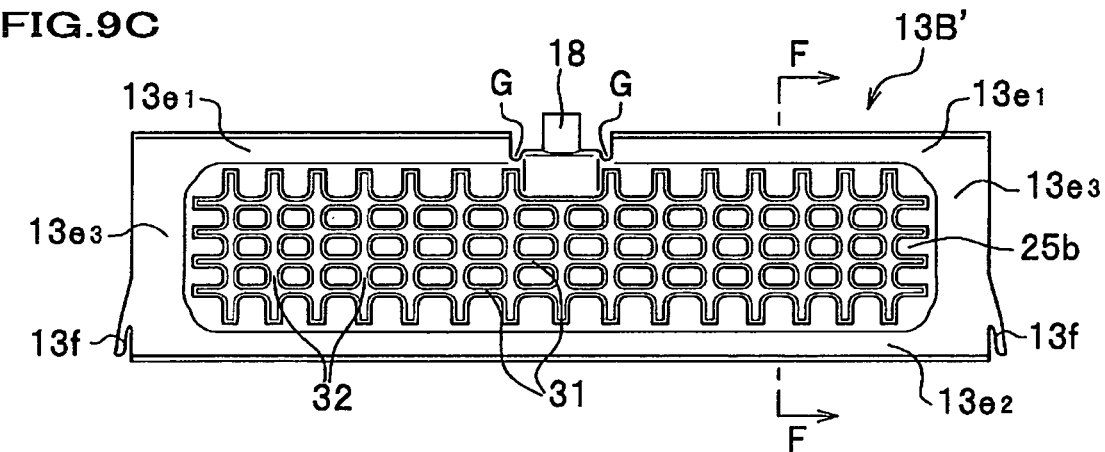
FIG. 9C is a plan view of a sub air chamber according to the third embodiment which is spread and viewed from the inside of the wheel in the radial direction of the wheel.
Figure 9D:
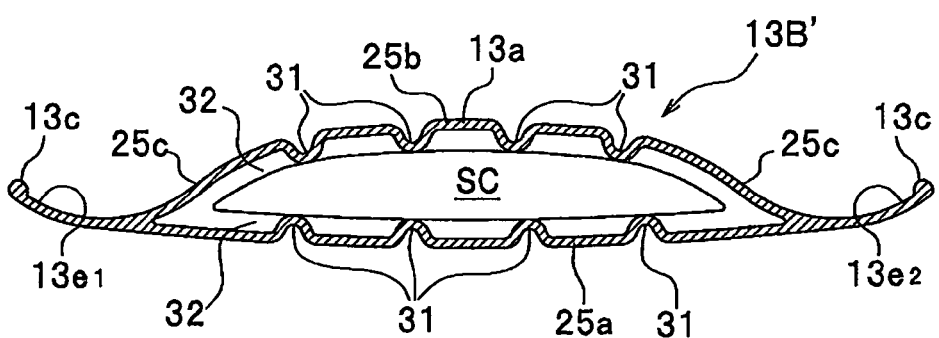
FIG. 9D is a cross section of the sub air chamber member, taken along line F-F in FIG. 9C.

FIG. 9C is a plan view of a sub air chamber according to the third embodiment which is spread and viewed from the inside of the wheel in the radial direction of the wheel, and FIG. 9D is a cross section of the sub air chamber member, taken along line F-F in FIG. 9C.

The sub air chamber member 13B' as the second modification of the sub air chamber member has, at both bottom plate 25a and bottom plate 25b, a plurality of longitudinal beads 31 by forming depressions in the bottom plate 25a of the sub air chamber member 13A which are hollowed toward the sub air chamber SC and extend in the circumferential direction of the wheel 10 and has a plurality of lateral beads 32 by forming depressions which are hollowed toward the sub air chamber SC and extend in the width direction of the wheel 10.

The longitudinal beads 31 and lateral beads 32 are formed both on the bottom plate 25a, which is curved to have a slight protrusion in the radial direction of the wheel and on the upper plate 25b which is curved to have a larger protrusion in the radial direction of the wheel. This more suppresses expansion of the upper plate 25b outwardly in the radial direction of the wheel 10 than the sub air chamber member 13B of the second embodiment when the air pressure in the sub air chamber SC increases.

Accordingly, when there is a variation in air pressure in the tire air chamber MC (see FIG. 2) in the case where a thickness of the bottom plate 25a and the upper plate 25b forming the sub air chamber SC is kept thin, a variation in the volume of the sub air chamber SC can be made smaller than the sub air chamber member 13B. This allows the sub air chamber SC to serve as the Helmholtz resonator, which efficiently reduces air column resonance.

This structure reduces a weight of the body 13a of the sub air chamber member 13B. Accordingly, a thickness of the edges 13e supporting the sub air chamber member 13B against the centrifugal force can be made smaller by the reduced weight of the body 13a. Thus, the vehicle wheel 10 to which the sub air chamber members 13B' are fixed can be reduced in weight.

Fourth Embodiment (Third Modification of Sub Air Chamber)

Figure 10A:
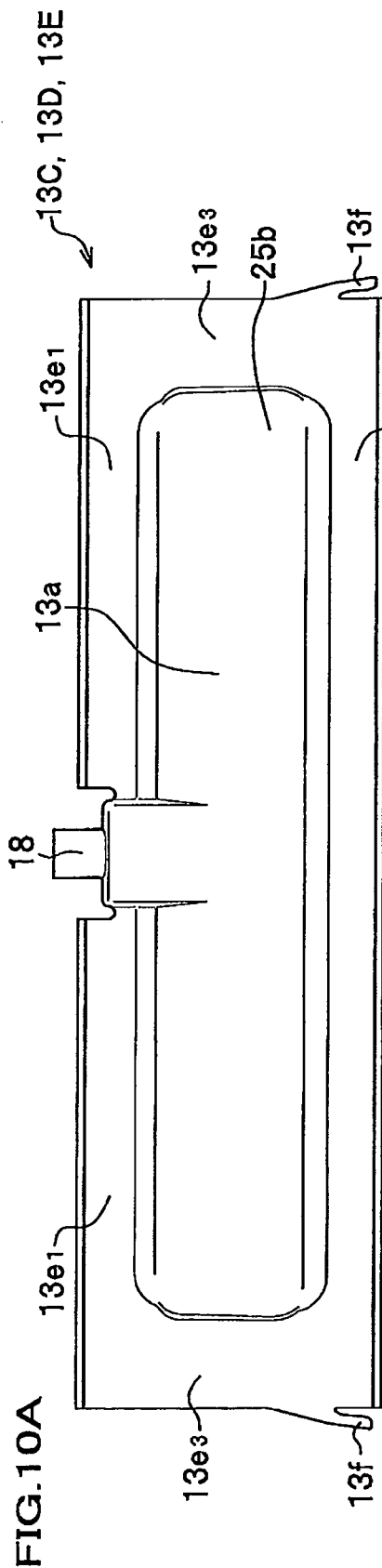
FIG. 10A is a plan view of a sub air chamber according to the fourth embodiment which is spread and viewed from the outside of the wheel in the radial direction of the wheel.
Figure 10B:
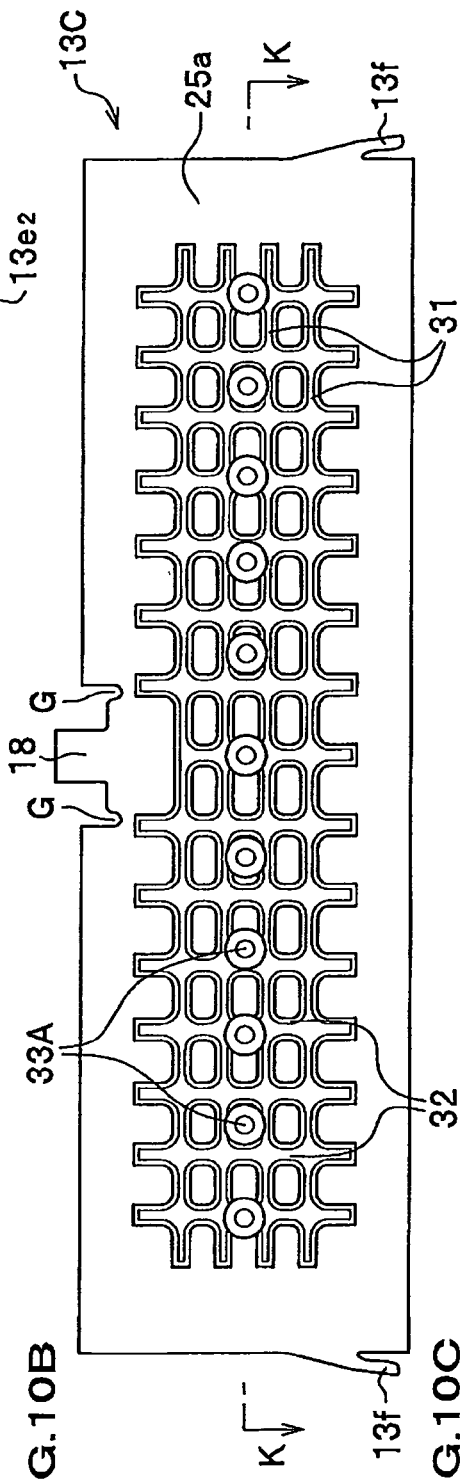
FIG. 10B is a plan view of a sub air chamber according to the fourth embodiment which is spread and viewed from the inside of the wheel in the radial direction of the wheel.
Figure 10C:
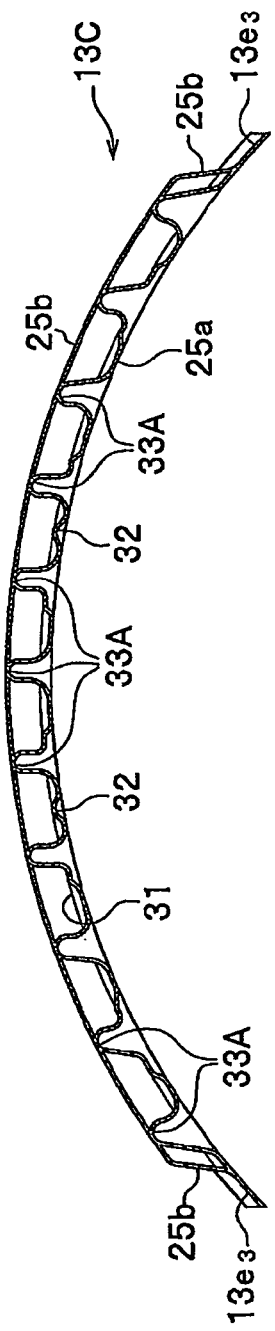
FIG. 10C is a cross section of the sub air chamber member, taken along line K-K in FIG. 10B.

FIG. 10A is a plan view of a sub air chamber according to the fourth embodiment which is spread and viewed from the outside of the wheel in the radial direction of the wheel 10. FIG. 10B is a plan view of a sub air chamber according to the fourth embodiment which is spread and viewed from the inside of the wheel in the radial direction of the wheel. FIG. 10C is a cross section of the sub air chamber member, taken along line K-K in FIG. 10B.

The sub air chamber member 13C as the fourth embodiment of the sub air chamber member includes a bottom plate 25a having a plurality of longitudinal beads 31 by forming depressions in the bottom plate 25a of the sub air chamber member 13A which are hollowed toward the sub air chamber SC and extend in the circumferential direction of the wheel 10. The sub air chamber member 13C further has a plurality of lateral beads 32 by forming a series of depressions in the bottom plate 25a of the sub air chamber member 13A which are hollowed toward the sub air chamber SC and extend in the width direction of the wheel 10. Further, the bottom plate 25a has deep depressions hollowed toward the upper plate 25b to have bottom of the depression with the bottom plate 25a connected to the upper plate 25b to form a plurality of upper plate-connecting parts 33A. In the sub air chamber member 13C of the fourth embodiment, eleven upper plate-connecting parts 33A are equi-distantly disposed and a series thereof extends in the circumferential direction at middle in the width direction of the wheel 10.

As mentioned, the longitudinal beads 31 and lateral beads 32 are formed in the bottom plate 25a, which is curved to have a slight protrusion in the radial direction of the wheel. Further, the upper-plate connecting parts 33A are locally formed by having deep depression extend to the upper plate 25b. This more suppresses expansion of the bottom plate 25a and the upper plate 25b outwardly in the sub air chamber member 13C than the case of the sub air chamber member 13B of the second embodiment when the air pressure in the sub air chamber SC increases. This is because a distance between the bottom plate 25a and the upper plate 25b forming the sub air chamber SC is surely kept.

Accordingly, when there is a variation in air pressure in the tire air chamber MC (see FIG. 2), a variation in the volume of the sub air chamber SC can be made smaller than the sub air chamber member 13B. This allows the sub air chamber SC to serve as the Helmholtz resonator, which efficiently reduces air column resonance.

This structure reduces a weight of the body 13a of the sub air chamber member 13C. Accordingly, a thickness of the edges 13e supporting the sub air chamber member 13B against the centrifugal force can be made smaller by the reduced weight of the body 13a. Thus, the vehicle wheel 10 to which the sub air chamber members 13C are fixed can be reduced in weight. The process of locally connecting the bottom plate 25a and the upper plate 25b as shown in the sub air chamber member 13C of the fourth embodiment is not limited to the fourth embodiment shown in FIGS. 10A to 10C, but can be modified.

Fifth Embodiment (Fourth Modification of Sub Air Chamber)

FIG. 11A is a cross section of the sub air chamber member, taken along line K-K in FIG. 10B. As shown in FIG. 11A, both the bottom plate 25a and the upper plate 25b locally have deep depressions to connect the bottom plate 25a to the upper plate at corresponding locations in which bottoms of both depressions at corresponding locations form upward-downward-depression connecting parts 33B at a plurality of locations in the sub air chamber members 13D. In the sub air chamber 13D of the fifth embodiment, eleven upward-downward-depression connecting parts 33B are formed which are aligned in line in the circumferential direction of the wheel 10.

Sixth Embodiment

FIG. 11B is a cross section of the sub air chamber member, taken along line K-K in FIG. 10B. As shown in FIG. 11B, the upper plate 25b locally has deep depressions to connect the upper plate 25b to the bottom plate 25a at bottoms of the depressions to form bottom-plate-connecting parts 33C at a plurality of locations in the sub air chamber members 13E. The sub air chamber member 13D of the fifth embodiment and the sub air chamber member 13E of the sixth embodiment have the same advantageous effect as the fourth embodiment.

In the sub-air chamber members 13C, 13D, and 13E, the upper-plate-connecting parts 33A, the upward-downward-depression connecting parts 33B, and the bottom-plate-connecting parts 13C are aligned in line in the circumferential direction of the wheel 10, respectively. However, the present invention is not limited to this, but it may be that a plurality of lines of either of the upper-plate-connecting parts 33A, the upward-downward-depression connecting parts 33B, or the bottom plate connecting parts 13C may be provided, each line being aligned in the circumferential direction of the wheel 10.

To modify this arrangement, the upper-plate-connecting parts 33A, the upward-downward-depression connecting parts 33B, and the bottom-plate-connecting parts 13C may be disposed zigzag.

Seventh Embodiment

First Modification of Vehicle Wheel

In the first to sixth embodiments, the second vertical wall 16 is provided on the side surface part 11e of the well 11c. However, in the vehicle wheel of the seventh embodiment, the second vertical wall surface 16 is formed on another rising part of the well 11c. FIG. 12 is a cross sectional view of a rim of the vehicle wheel according to the seventh embodiment.

As shown in FIG. 12, the well 11c of the rim 11 used in the vehicle wheel 10 have a small diameter part 23a and a large diameter part 23b connected to the small diameter part 23a through a step 11f.

In the rim 11, outside the large diameter part 23b, a bead seat 11a is formed via the side surface part 11e. More specifically, in the vehicle wheel of the seventh embodiment (a first modification of the vehicle wheel), the edge part 13e2 is fitted into the step part 11f of the rim 11 more inward in the radial direction of the wheel 10 than the side surface part 11e into which one of the edge parts (13e2) of the sub air chamber member 13. Here, in FIG. 12, the sub air chamber member 13 represents the sub air chamber members 13A to 13E according to the first to sixth embodiments.

Therefore, the vehicle wheel 10 in the seventh embodiment, the outer circumferential surface 11d of the well 11c for fixing the sub air chamber member is formed further more inwardly in the radial direction of the wheel 10 than the vehicle wheel 10 according to the first to sixth embodiments.

As a result, the vehicle wheel 10 according to the seventh embodiment has a further shorter circumferential length of the outer circumferential surface 11d of the well 11c, which results in further reduction in weight. The vehicle wheel 10 according to the seventh embodiment has a higher performance in putting the tire 20 on the rim 11 than the vehicle wheel 10 according to the first to sixth embodiments because the sub air chamber member 13 is shifted apart from the bead seat 11a inwardly in the radial direction of the wheel 10.

Eighth Embodiment

Second Modification of Vehicle Wheel

In the vehicle wheel of the first to seventh embodiments, four sub air chamber members 13 are approximately equidistantly disposed along the outer circumferential surface 11d of the well 11c. However, if the number of the sub air chamber members 13 may be five or more, or three or less.

Figure 13A:
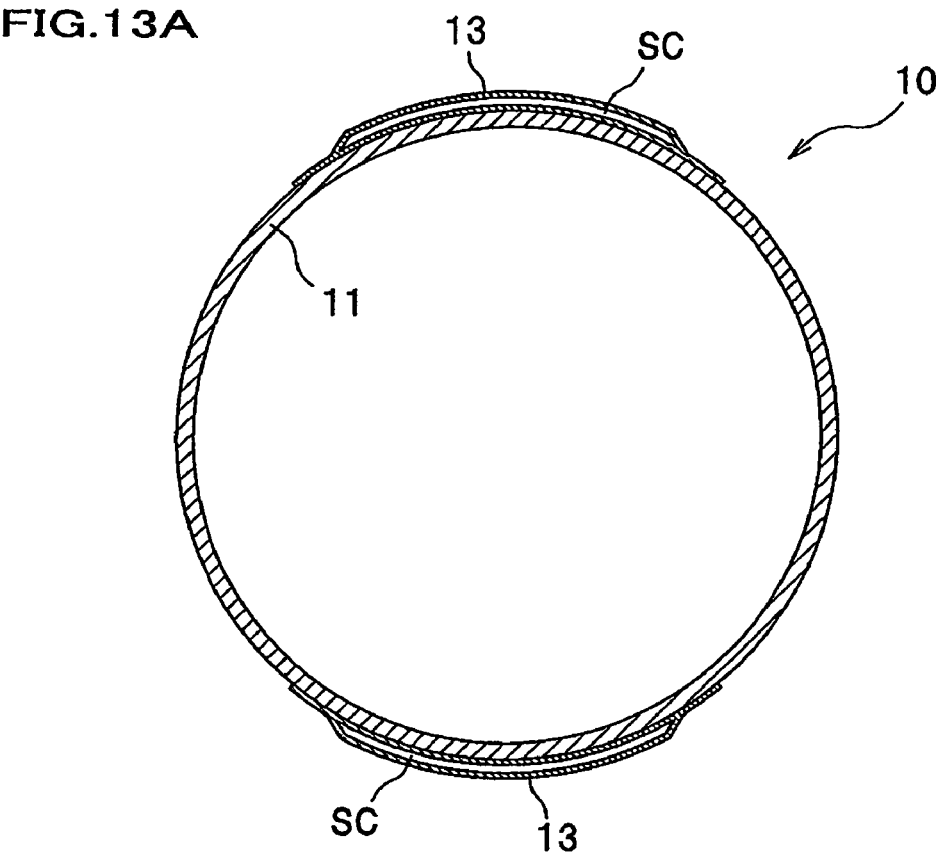
FIG. 13A is a side sectional view of the vehicle wheel according to an eighth embodiment.

FIG. 13A is a side sectional view of the vehicle wheel according to the eighth embodiment (second modification of vehicle wheel), wherein the arrangement of the sub air chamber members is modified.

In the vehicle wheel 10 according to the eighth embodiment, as shown in FIG. 13A, the sub air chamber members 13 are disposed diametrically opposite (180° apart) along the circumferential surface of the well 11c.

Ninth Embodiment

Third Modification of Vehicle Wheel

Figure 13B:
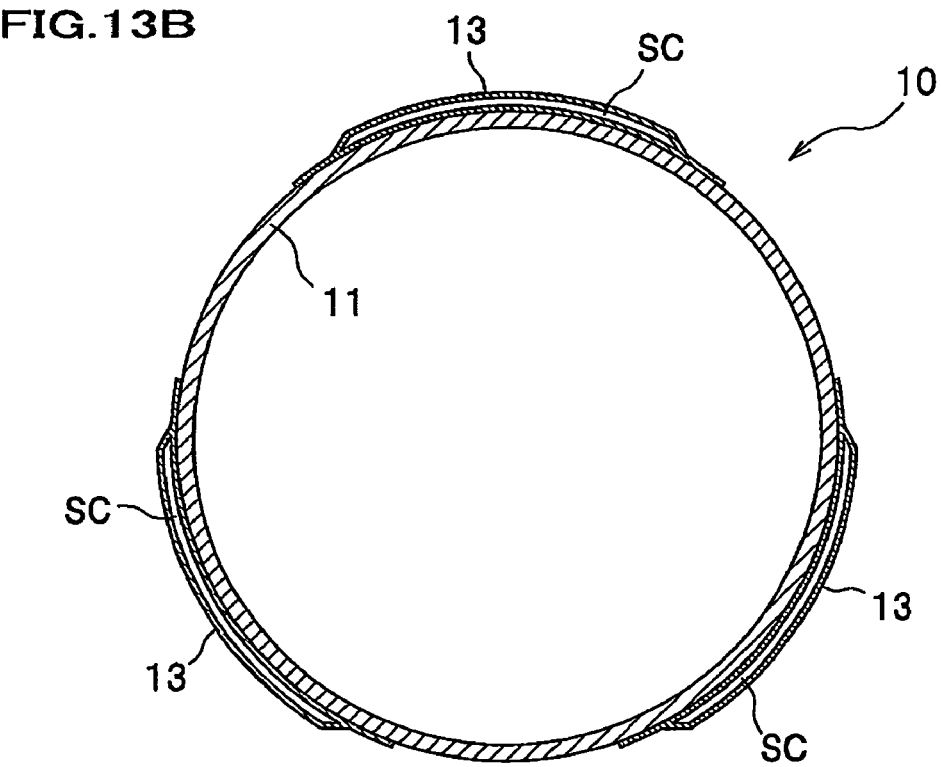
FIG. 13B is a side sectional view of the vehicle wheel according to a ninth embodiment.

In the vehicle wheel 10 according to the ninth embodiment, as shown in FIG. 13B, three sub air chamber members 13A are disposed 120° apart along the outer circumferential surface 11d of the well 11c.

As mentioned above, in the vehicle wheel 10 according to the present invention, there is no limit in the number of the sub air chamber members 13. However, in consideration of the efficiency in reduction in noise, it is preferable to dispose four or more sub air chamber members 13 oppositely via the wheel rotation center axis of the wheel 10.

Tenth Embodiment

Modification of Communication Through Hole

Figure 14A:
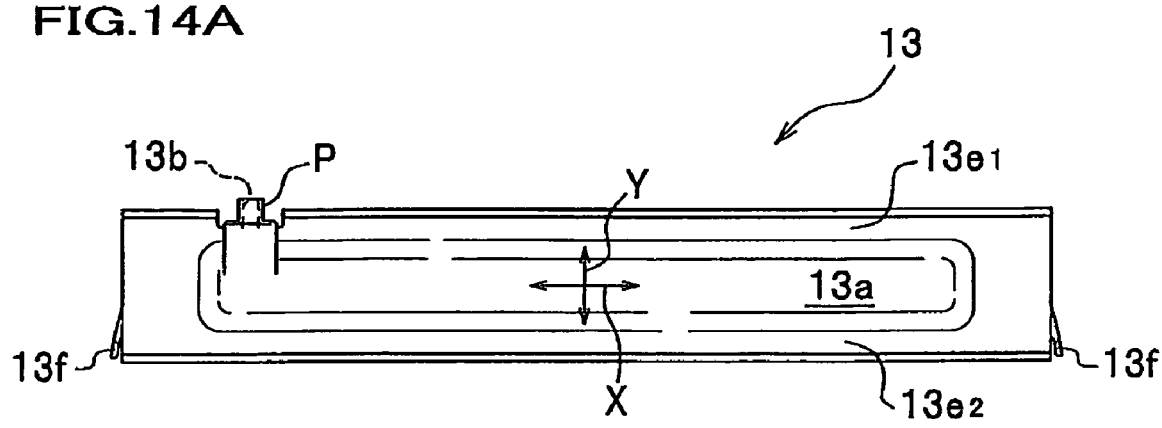
FIGS. 14A and 14B are plan views of the sub air chamber members according to a tenth embodiment.
Figure 14B:
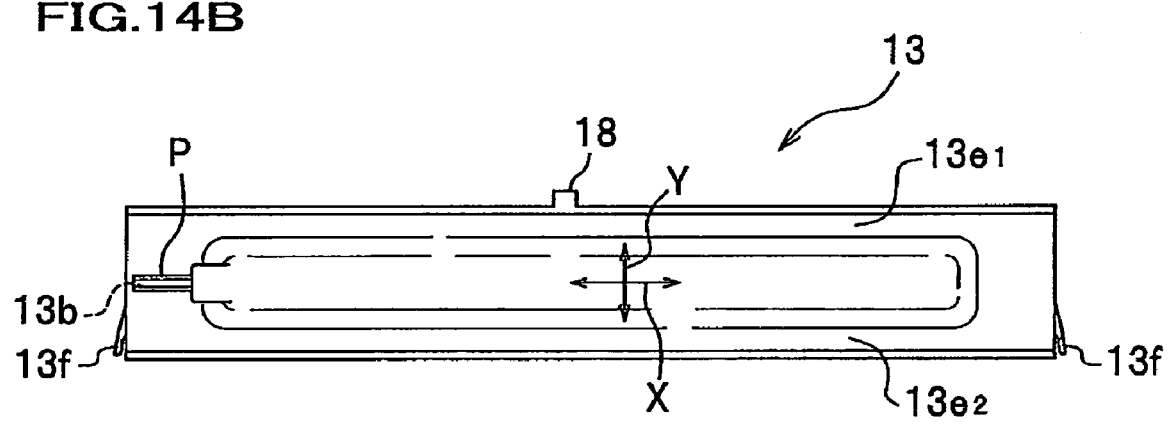

In the vehicle wheel according to the first to ninth embodiments, the communication through hole 13b is formed at middle of the sub air chamber member 13 in the longitudinal direction. The present invention is not limited in location of the communication through hole 13b as long as there is no adverse effect in putting the tire 20 on the rim 11. FIGS. 14A and 14B are plan views of the sub air chamber members to show locations of the communication through holes 13b.

The sub air chamber member 13 shown in FIG. 14A has a pipe P having the communication through hole 13b therein. As mentioned above, the pipe P also serves as a stopper of rotation which is fitted into the notch 14a (see FIG. 7B) formed in the vertical wall 14 (see FIG. 7B). The pipe P protrudes in the direction Y orthogonal with the rotation direction X of the wheel 10 at one end in the longitudinal direction of the sub air chamber member 13.

The sub air chamber member 13 shown in FIG. 14B has a pipe P which protrudes in the rotation direction X of the wheel 10 at one end of the longitudinal direction of the sub air chamber member 13. The sub air chamber member 13 has a protrusion 18 for stopper in the circumferential direction of the wheel 10. The protrusion 18 protrudes from the edge part 13e1 in the Y direction orthogonal to the rotation direction X of the wheel 10 at middle in the longitudinal direction of the sub air chamber member 13.

Eleventh Embodiment

A vehicle wheel according to the eleventh embodiment has sub air chamber members (Helmholtz resonator) which are fixed to the well 11c by being fitted into the well 11c.

First, with reference to FIGS. 1, 15, and 16 will be described a whole structure of the vehicle wheel, and then a structure of the sub air chamber member.

Whole Structure of Wheel

Figure 15:
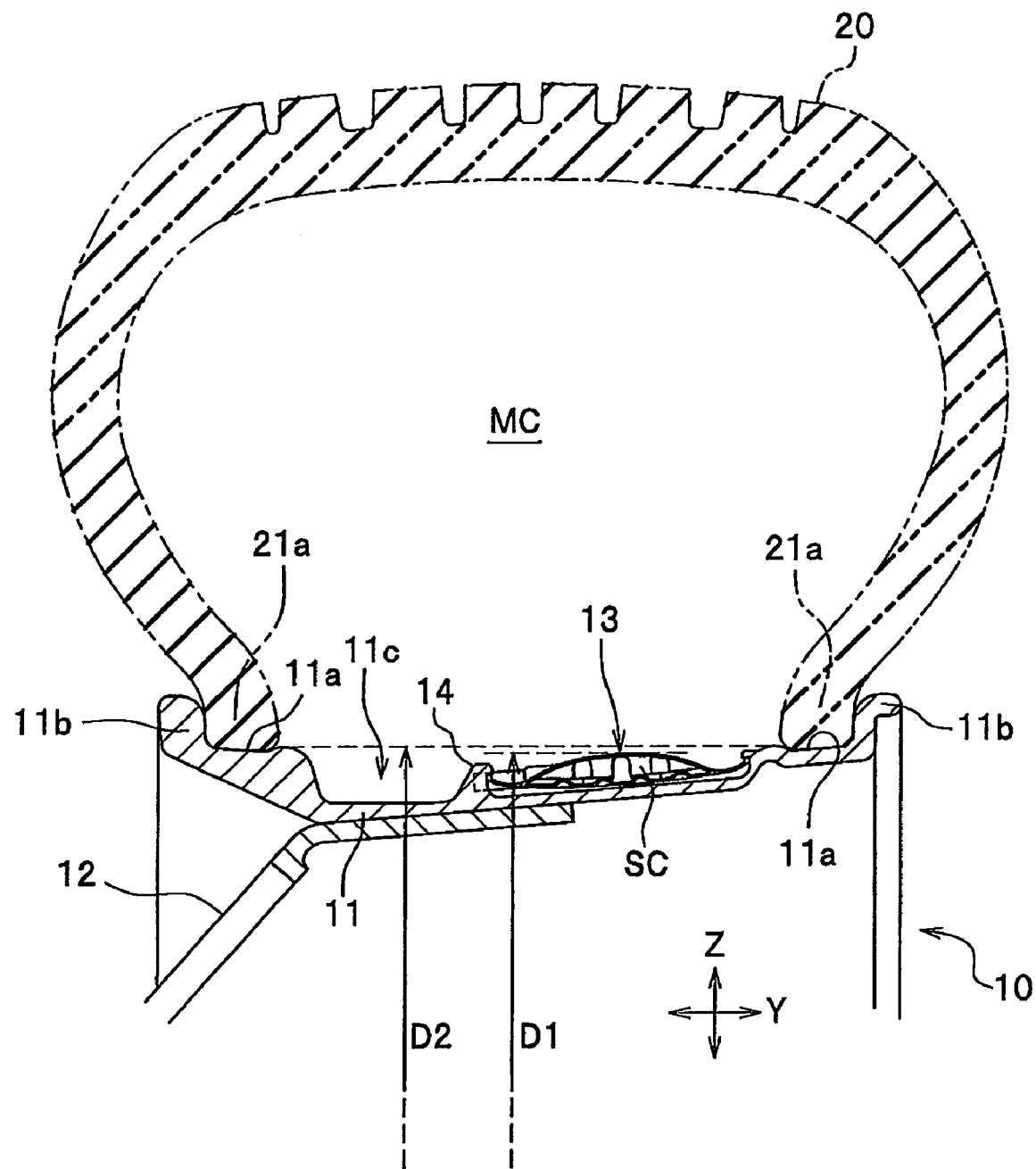
FIG. 15 is a sectional front view of a main part of the vehicle wheel according to an eleventh embodiment on which a tire is put.

FIG. 15 is a sectional front view of a main part of the vehicle wheel according to the eleventh embodiment on which a tire is put.

Figure 16:
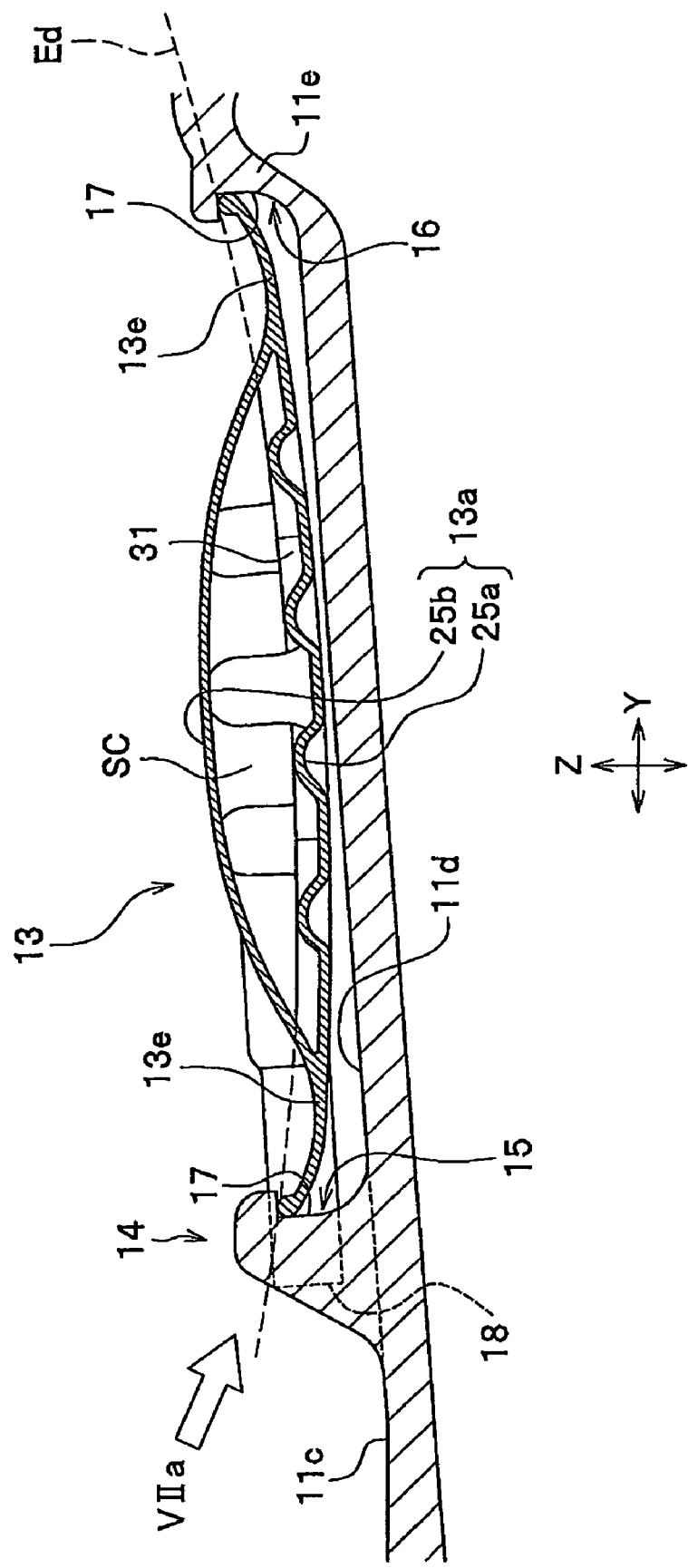
FIG. 16 is an enlarged sectional view of the well of the vehicle wheel according to the eleventh embodiment.

FIG. 16 is an enlarged sectional view of the well 11c of the vehicle wheel according to the eleventh embodiment.

As shown in FIG. 1, the vehicle wheel 10 includes the rim 11 for holding the tire 20 put thereon, the disk 12 for connecting the rim 11 to the hub of the vehicle (not shown), and the sub air chamber 13 fixed to the outer circumferential surface 11d of the well 11c.

As shown in FIG. 15, the rim 11 includes the bead seats 11a formed at edges, in the width direction, of the vehicle wheel 10, the rim flanges 11b extending from the bead seats 11a and being bent outwardly in a radial direction of the vehicle wheel 10 (on an upper side of FIG. 15) in a form of letter "L", and the well 11c recessed in an inward radial direction of the vehicle wheel 10 between the bead seats 11a (on an under side of FIG. 15).

The tire 20 is put on the rim 11 with the beads 21a being seated on the bead seats 11a. This forms a tire air chamber MC which is an air-tight space having an annular shape between an outer circumferential surface 11d and an inner circumferential surface of the tire 20.

The well 11c is provided to allow the beads 21a and 21a of the tire 20 to fall therein when the tire 20 is put on the rim 11.

Formed on the outer circumferential surface of the well 11c is an annular vertical wall 14 extending in a circumferential direction of the rim 11 on the outer circumferential surface of the well 11c.

The vertical wall 14 is formed so as to vertically extend from the outer circumferential surface 11d to form a first vertical wall surface 15 rising and extending from the outer circumferential surface 11d of the well 11c outwardly in the radial direction Z of the wheel (an upper side of FIG. 16).

In addition, on the outer circumferential surface 11d, the side surface part 11e is formed at a location on the well 11c inward in width direction of the wheel 10 (on the side of the vehicle) with a second vertical wall 16 facing the first vertical wall surface 15.

The vertical wall 14 can be formed integrally with the well 11c during casting the rim 11.

These first vertical wall surface 15 and the second vertical wall surface 16 have channels 17, respectively. These channels 17 provide annular recesses and openings extending along the circumferential direction of the wheel 10 on the outer circumferential surface 11d of the well 11c. The openings face each other. Fitted into these channels 17 are edge parts 13e of the sub air chamber member 13A.

The channels 17 are formed by machining the vertical wall 14 and the side surface part 11e, respectively.

As shown in FIG. 15, from the edge (left side of FIG. 15), in an outward direction from the vehicle, of the rim 11, the disk 12 extends inwardly in the radial direction of the vehicle wheel 10. The rim 11 and the disk 12 are manufactured, for example, with a light weight high strength material such as an aluminum alloy and a magnesium alloy.

Figure 17:
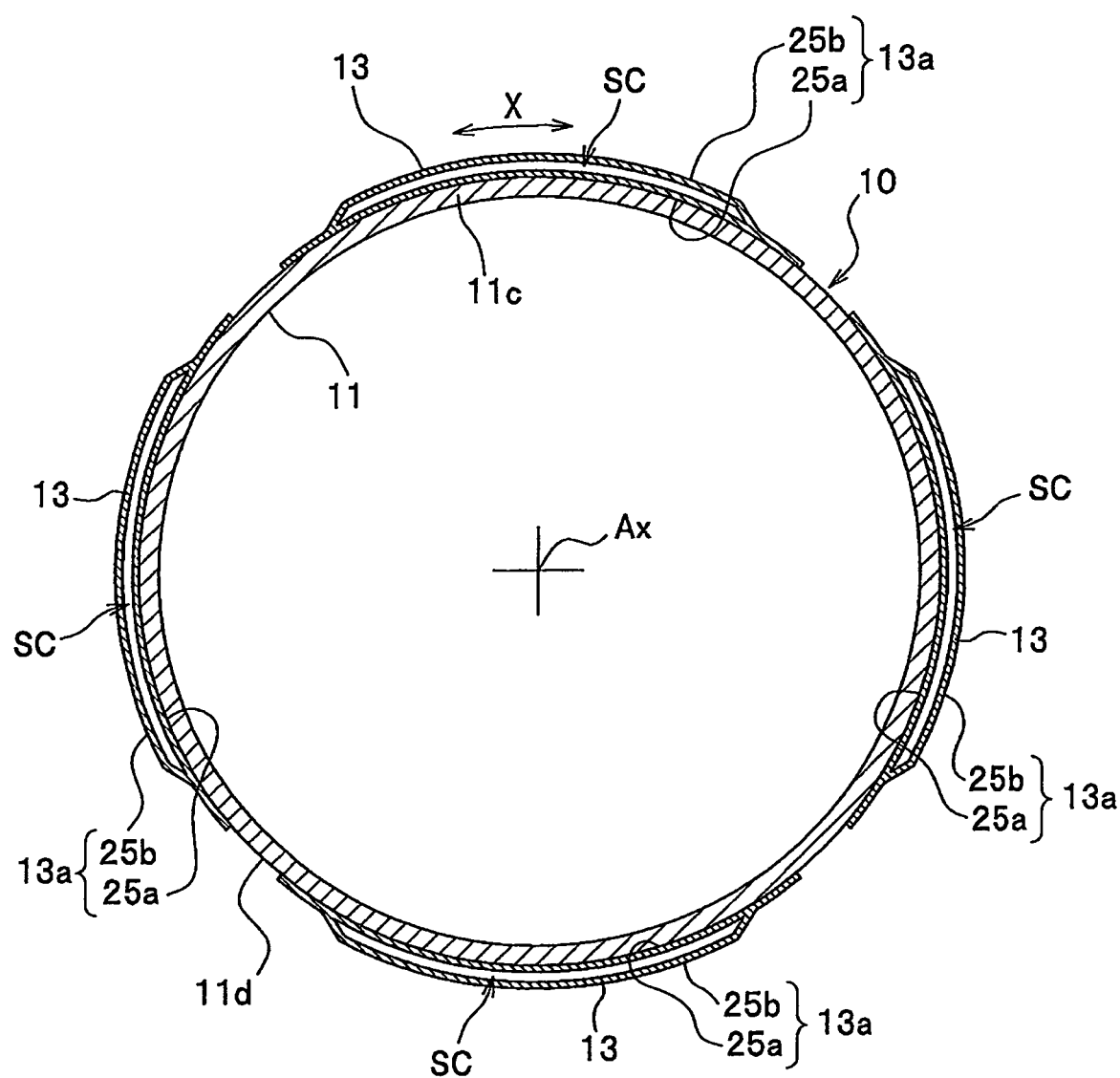
FIG. 17 is a side sectional view of the vehicle wheel according to the eleventh embodiment to show locations where the sub air chambers are disposed.
Figure 19A:
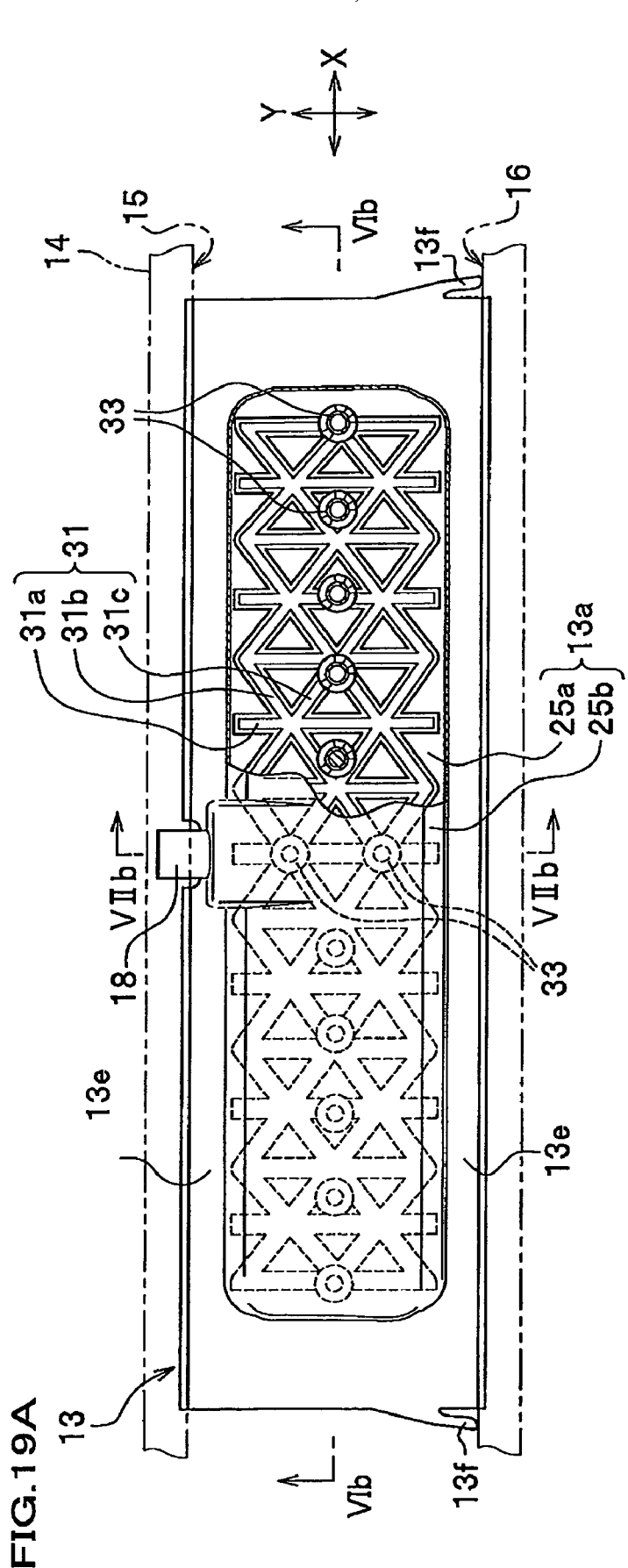
FIG. 19A is a plan view of the sub air chamber member according to the eleventh embodiment of which a part of the upper plate is cut away.
Figure 19B:
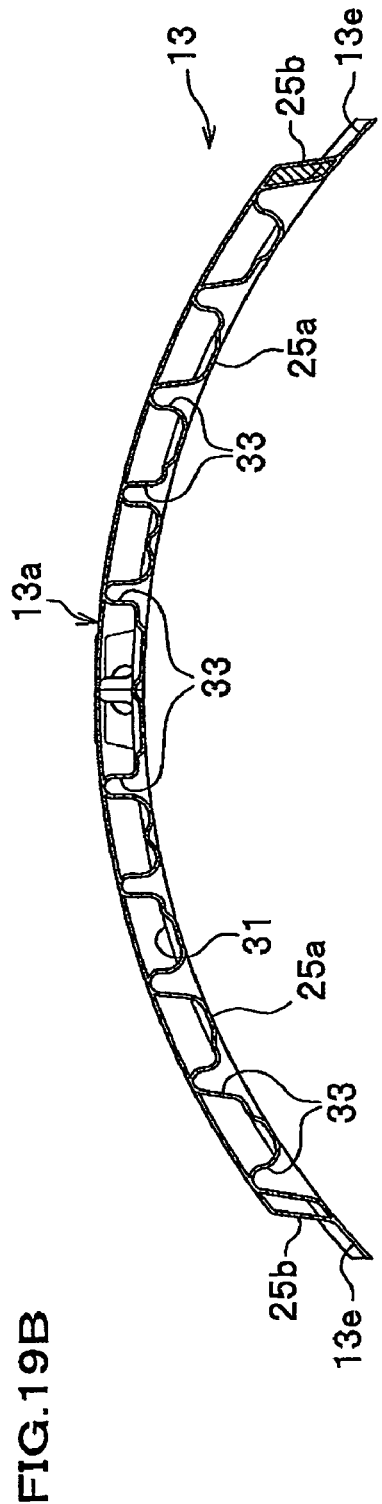
FIG. 19B is a cross sectional view of the sub air chamber member taken along line VIb-VIb in FIG. 19A.
Figure 20A:
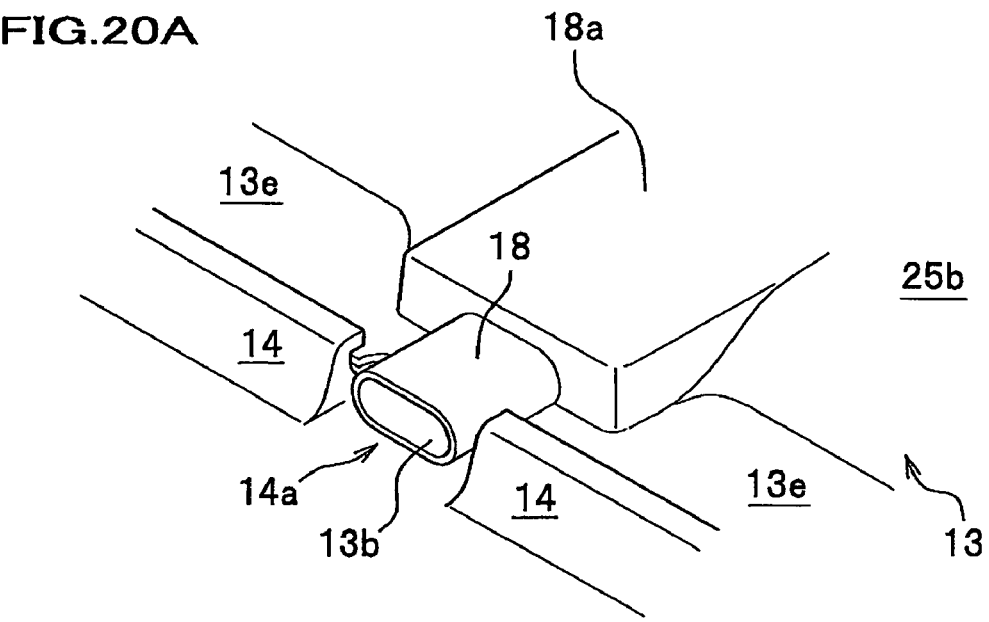
FIG. 20A is a perspective view of the protruding part (pipe) of the sub air chamber member which is viewed in a direction VIIa in FIG. 16.
Figure 20B:
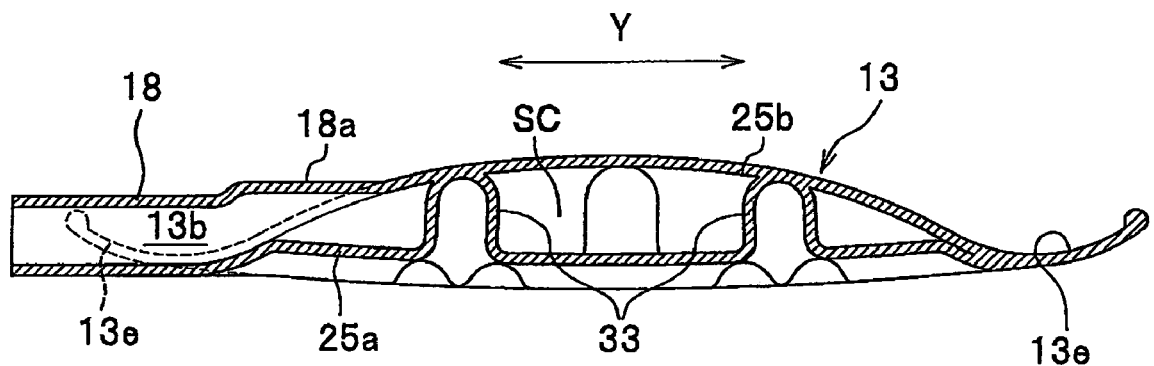
FIG. 20B is a cross sectional view taken along line VIIb-VIIb in FIG. 19A.
Figure 20C:
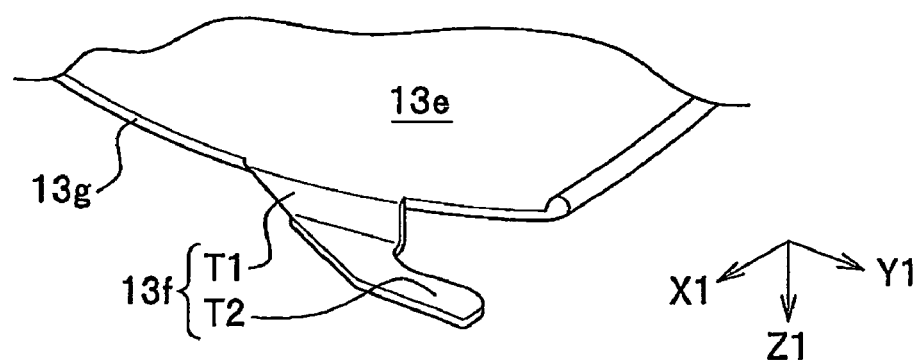
FIG. 20C is a perspective view of the temporary fixing tacks in the sub air chamber member viewed in a direction VIIc in FIG. 18.

However, the material for the disk 12 is not limited to the aluminum alloy and the magnesium alloy, but may be formed with steel or the like. Further, the vehicle wheel 10 may be a spoke wheel. Structure of Sub Air Chamber Next will be described the sub air chamber member 13. FIG. 17 is a side sectional view of the vehicle wheel to show locations where the sub air chambers are disposed. FIG. 18 is a perspective view of the sub air chamber member according to the eleventh embodiment. FIG. 19A is a plan view of the sub air chamber member of which a part of the upper plate is cut away. FIG. 19B is a cross sectional view of the sub air chamber member taken along line VIb-VIb in FIG. 19A. FIG. 20A is a perspective view of the protruding part (pipe) of the sub air chamber member which is viewed in a direction VIIa in FIG. 16. FIG. 20B is a cross sectional view taken along line VIb-VIb in FIG. 19A. FIG. 20C is a perspective view of the temporary fixing tacks 13f in the sub air chamber ember viewed in a direction VIIc in FIG. 18. In FIG. 19A, beads and connecting parts of the bottom plate 25a, covered by the upper plate 25b, are indicated by imaginary lines.

As shown in FIG. 17, in the eleventh embodiment, four sub air chamber members 13 are disposed on the well 11c equi-distantly along the circumferential direction X of the wheel 10. In other words, the vehicle wheel 10 has two pairs of sub air chamber members 13, each pair of sub air chamber members 13 facing each other across a rotation center Ax of the vehicle wheel 10. In FIG. 17, the sub air chamber members 13 form the sub air chambers SC therein.

The sub air chamber members 13 are, as shown in FIG. 18, a long member extending in the circumferential direction X of the wheel 10 and include a body 13a, a protruding part 18, and edge parts 13e. In the eleventh embodiment, as shown in FIG. 17, four sub air chamber members curves in the longitudinal direction and are disposed along the outer circumferential surface 11d of the well 11c equi-distantly.

The body 13a mentioned above includes, as shown in FIGS. 19A and 19B, the bottom plate 25a and the upper plate 25b forming the sub air chamber SC (see FIG. 17) therebetween. In this embodiment, the bottom plate 25a and the upper plate 25b have the same thickness. However, the thickness of the bottom plate 25a and the upper plate 25b may be different from each other.

Formed on the bottom plate 25a is a plurality of beads (channels, folds) 3 as shown in FIG. 19A. The beads 31 according to the embodiment are formed such that the bottom plate 25a is partially hollowed toward the sub air chamber SC (on the side of upper plate 25b) as shown in FIG. 16. More specifically, the beads 31 protrude outwardly in the radial direction Z of the wheel 10. However, the beads 31 may be formed so that parts of the bottom plate 25a protrude inwardly in the radial direction of the wheel 10 (on the lower side of FIG. 16). Here, the sub air chamber member 13 formed so that the bottom plate 25a protrude outwardly in the radial direction Z of the wheel 10 is more miniaturized than the sub air chamber member 13 formed so that the bottom plate 25a protrude inwardly in the radial direction Z of the wheel 10.

The beads 31 according to the eleventh embodiment is formed so that as shown in FIG. 16, an alignment direction Ed of the beads 31 is orthogonal with the first vertical wall surface 15 and the second vertical wall surface 16. More specifically, as shown in FIG. 19A, the beads 31 are formed and aligned in lines crossing the first veridical wall surface 15 and the second wall surface 16 when the bottom plate 25a is viewed from the upper plate 25b. The beads 31 are formed only in an extending direction orthogonally intersecting the first vertical wall surface 15 and the second wall surface 16 along the outer circumferential surface 11d. Further, the beads 31 are formed in an extending direction orthogonally intersecting the circumferential direction X of the outer circumferential surface 11d.

In other words, the sub air chamber member 13 according to the eleventh embodiment the beads are not aligned in a line in the extending direction of the first vertical wall 15 and the second vertical wall surface 16, i.e., the circumferential direction X of the wheel 10.

The beads 31 according to the eleventh embodiment comprise two types of beads, namely, first beads 31a which are aligned in lines orthogonal with the first vertical wall surface 15 and the second vertical wall surface 16 and second beads 31b which are aligned in lines diagonal with the first vertical wall surface 15 and the second wall surface 16. The second bead 31b and 31c are disposed mutually line-symmetry about a center line on the bottom plate 25a which crosses a center of the bottom plate 25a in the width direction Y of the wheel 10. Each second bead 31b and each second bead 31c are equidistantly disposed in the circumferential direction X of the wheel 10. The first beads 31a are disposed so as to intersection between the second beads 31b and 31c.

Formed in the bottom plate 25a are a plurality of connecting parts 33 as shown in FIGS. 19A and 19B.

The connecting part 33 is cap-shaped such that the bottom plate 25a is locally hollowed toward the upper plate 25b, wherein the bottom of the depression is connected to the upper plate 25b. In other words, the connecting part 33 partially connects the bottom plate 25a to the upper plate 25b.

The connecting parts 33 are disposed in a line around center of the body 13a in the width direction of the wheel 10 along the circumferential direction X of the wheel. Two connecting parts 33 arranged near the protruding part 18 are disposed in line in the width direction of the wheel 10 as mentioned later.

The bottom plate 25a (see FIG. 16) where the connecting parts 33 and the beads 31 are formed forms a curve surface protruding on a side of the outer circumferential surface 11d of the well 11c together with the edge part 13e extending to the first vertical wall surface 15 and the second vertical wall surface 16.

As shown in FIG. 16, the upper plate 25b is curved to be swelled over the bottom plate 25a disposed along the outer circumferential surface 11d of the well 11c.

A shape of the sub air chamber SC is not specifically limited, but it is preferable to be flat in cross sectional view. The sub air chamber SC according to the eleventh embodiment is flat, i.e., has a flat shape which is thin in the direction X of the wheel 10. As shown in FIG. 15, in the sub air chamber member 13, the maximum diameter D1 passing through a center of the rim 11 is determined to be smaller than the diameter D2 passing through the center of the rim 11 to the bead seat 11a.

Preferably, a volume of the sub air chamber SC in the sub air chamber member 13A is approximately from 50 to 250 cc.

Setting the volume of the sub air chamber SC within this range (approximately from 50 to 250 cc) allows the sub air chamber member 13A to provide a sufficient noise reduction effect with suppression of increase in weight, which provides reduction in weight of the vehicle wheel 10.

A total length of the sub air chamber members 13A in the circumferential direction of the vehicle wheel 10 can be appropriately determined in consideration of a mass distribution adjustment and easiness in assembling the sub air chamber members 13A into the well 11c, wherein a circumferential length of the rim 11 is a maximum total length of the sub air chamber members 13A.

The protruding part 18 is provided to surely prevent the sub air chamber member 13 from rotating, while the vehicle wheel 10 shown in FIG. 1 rotates.

The protruding part 18 protrudes, as shown in FIG. 19A, from the body 13a in a direction orthogonal with the circumferential direction X (rotation direction of the wheel 10 (see FIG. 1).

More specifically, the protruding part 18 extends from a root 18a of the upper plate 25b of the body 13a as shown in FIG. 20A toward the side of the vertical wall 14.

A tip of the protruding part 18 is fitted into the notch 14a formed in the vertical wall 14. The notch 14a according to the eleventh embodiment is formed when the rim 11 (see FIG. 1) is cast or machined in the vertical wall 14.

The protruding part 18 comprises, as shown in FIG. 20B, a pipe having a communication through hole 13b therein for providing communication between the sub air chamber SC and the tire air chamber MC (see FIG. 15).

A cross sectional shape of the communication through hole 13b is not specifically limited. In the eleventh embodiment, the cross sectional shape is an oval (see FIG. 20A), but may be any of a circle, a polygon, or a half circle. If the cross sectional shape is a circle, it is preferable that a diameter of the circle is equal to or grater than 5 mm. If the cross sectional shape of the communication through hole 13b is other than the circle, it is preferable that the cross sectional area is that of the circle having a diameter equal to or greater than 5 mm.

A length of the communication through hole 13b is determined to satisfy Eq. (1) which determines a resonance frequency of a Helmholtz resonator.

The resonance frequency f0 can be adjusted to that of the tire air chamber MC. In this process, all resonance frequencies f0 of three sub air chamber members 13A shown in FIG. 17 can be set to the same value or different values. More specifically, if the tire air chambers MC has two resonance frequencies f1 and f2, the resonance frequency f0 of three sub air chamber members 13A can be set to be (f1+f2)/2.

Further, the resonance frequencies f0 of a pair of sub air chamber members 13A opposite each other about the wheel rotation center axis can be set to a frequency f1 and a resonance frequency f0 of the other pair of sub air chamber 13 can be set to be the frequency f2. Further all resonance frequencies f0 of four sub air chamber members 13 may be set to be either of f1 or f2.

Edge Part

The edge part 13e comprises a plate member extending from the body 13a toward circumference of the body 13a as shown in FIG. 18. More specifically, the edge part 13e is a part where the bottom plate 25a is connected to the upper plate 15b as shown in FIGS. 16 and 19B. The edge part 13e extends as shown in FIG. 19A, from the body 13a in the circumferential direction X as well as in the width direction of the wheel 10, and the tips thereof are fitted into the channel 17 (see FIG. 16) of the vertical wall surface 15 and the second vertical wall surface 16.

The edge part 13e extended from the body 13a in the width direction Y of the wheel 10 corresponds to "edge part" in Claims of the present application.

The edge part 13e extending toward the first vertical wall surface 15 and the second vertical wall surface 16 forms the curve surface (see FIG. 16) protruding on the side of the outer circumferential surface 11d of the well 11c together with the bottom plate 25a.

The thickness of the edge part 13e according to the eleventh embodiment is set to be the same as the bottom plate 25a and the upper plate 25b. The edge part 13e has sufficient spring elasticity (spring constant) by appropriately determining a thickness thereof and a plastic material.

Formed at the edge part 13e is the temporary fixing tacks 13f. The temporary fixing tacks 13f is, as mentioned later, used in a temporarily assembling before final assembling of the sub air chamber member 13 with the well 11c.

The temporary fixing tacks 13f are provided on both edges, in the circumferential direction X of the wheel 10, of the edge part 13e. The temporary fixing tacks 13f are formed opposite to the protruding part 18, i.e., on the side of the second vertical wall surface 16.

The temporary fixing tacks 13f according to the eleventh embodiment is a folded plate member provided on the edge 13g of the edge part 13e as shown in FIG. 20C and includes a supporting plate T1 extending from the edge 13g and folded like a hook so as to be directed in a direction Z1 (inwardly in the radial direction of the wheel 10) and a stopper plate member T2 extending from the supporting plate T1 in a direction X1 (outwardly in the circumferential direction of the wheel 10 as well as in a direction Y1 (toward the second vertical wall surface 16 (see FIG. 19A).

The sub air chamber member 13 is formed with plastic, and in consideration of reduction in weight, increase in mass productivity, reduction in manufacturing cost in the sub air chamber member 13A, and keeping air-tightening the sub air chamber SC, a material having a light weight and high stiffness and allowing a blow molding is preferable. Particularly, polypropylene is preferable because of high resistance to repeated bending fatigue.

Figure 21A:
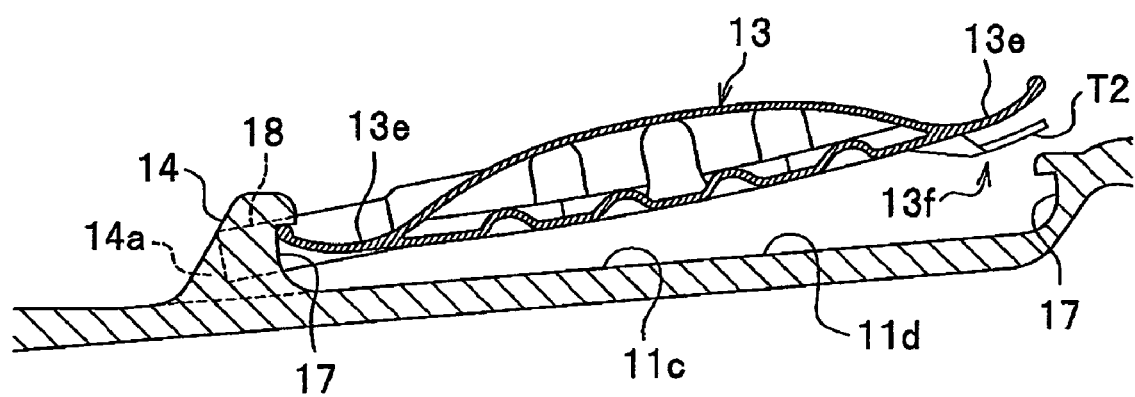
FIGS. 21A and 21B are cross sectional views to illustrate a method of assembling the sub air chamber member into the well according to the eleventh embodiment.
Figure 21B:
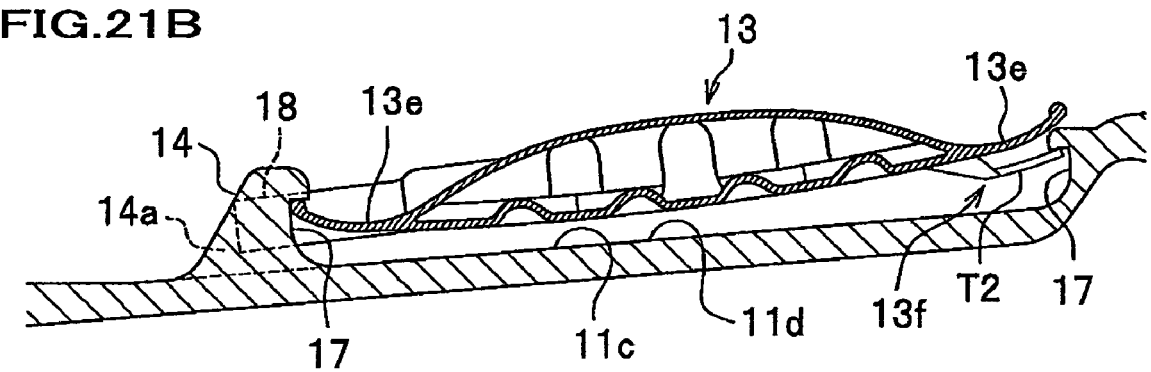

Next will be described a method of assembling the sub air chamber member 13 into the well 11c. FIGS. 21A and 21B are cross sectional views to illustrate the method of assembling the sub air chamber member into the well 11c.

In the method of assembling the sub air chamber member 13, as shown in FIG. 21A, first the edge part 13e on the side of the protruding part 18 of the sub air chamber member 13 is fitted into the channel 17 of the vertical wall surface 15. In this process, the protruding part 18 is fitted into the notch 14a.

Next, as shown in FIG. 21B, the stopper plate members T2 of the temporary fixing tacks 13f are fitted into the channel 17 of the second vertical wall surface 16 while the sub air chamber member 13 is bent such that a face of the sub air chamber member 13 on the side of the outer circumferential surface 11d of the well 11c more protrudes. As a result, the sub air chamber member 13 is temporarily assembled with the well 11c. When the sub air chamber member 13 temporarily assembled is pressed on the side of the outer circumferential surface 11d of the well 11c, the edge part 13e located on the side of the second vertical wall surface 16 is fitted into the channel 17 of the second vertical wall surface 16 as shown in FIG. 16. As a result, the final assembling the sub air chamber member 13 into the well 11c, namely, fixing the sub air chamber member 13 to the well 11c, has been completed.

Next will be described an operation of the vehicle wheel 10 according to the eleventh embodiment.

The vehicle wheel 10 according to the eleventh embodiment is assembled by fitting the sub air chamber member 13 into the rim 11 (well 11c) differently from the prior art vehicle wheel (for example, disclosed in JP 2004-90669 A) in which a plurality of partition walls and 11d are successively assembled to connect these parts with the air tightness being secured. Therefore, the vehicle wheel 10 can reduce the number of manufacturing processes and a manufacturing cost with mass productivity increased as compared with the vehicle wheel according to the prior art disclosed in JP 2004-90669 A. Further, the vehicle wheel 10 according to the eleventh embodiment keeps a performance in reducing noise because no special attention is required for keeping the air tightness in the sub air chamber SC differently from the prior art vehicle wheel.

Further, because the sub air chamber member 13 is made of plastic, the vehicle wheel 10 according to the present invention is more reduced in weight than the prior vehicle wheel disclosed in JP 2004-90669 A. Further, because the sub air chamber member 13 can be formed by the blow molding or the like, the vehicle wheel according to the present invention is superior in mass productivity to the prior art vehicle wheel disclosed in JP 2004-90669 A.

Further, in the vehicle wheel 10, as shown in FIG. 15, the maximum diameter D1 passing through the wheel rotation center axis to the outmost side in the radial direction of the vehicle wheel is determined to be smaller than the diameter D2 passing through the wheel rotation center axis to the bead seats 11a. This decreases a possibility in that a tool such as a lever or a tire 20 (beads 21a or the like) contacts the sub air chamber member 13A. As a result, a performance of putting the tire 20 increases.

Further, in the vehicle wheel 10, as shown in FIG. 16, the sub air chamber SC has a flat shape in radial direction Z of the wheel 10, which suppresses the maximum diameter D1 passing through the wheel rotation center axis of the vehicle wheel 10 with a sufficient predetermined volume of the sub air chamber SC being provided.

Further, in the vehicle wheel 10 according to the eleventh embodiment, as mentioned above, when the sub air chamber member 13 is fixed to the well 11c, the edge part 13e is fitted into the channels 17 of the first vertical wall surface 15 and the second vertical wall surface 16. In this process, because the edge part 13e has the predetermined spring constant, the sub air chamber member 13 is simply and strongly fixed between the first vertical wall surface 15 and the second vertical wall surface 16.

Further, the structure of the sub air chamber member 13 allows a temporary assembling the sub air chamber member 13 into the well 11c with the temporary fixing tacks before the final assembling the sub air chamber member into the well 11c. Accordingly, the sub air chamber member 13 which is once positioned with the temporary fixing tacks can be finally assembled using a mechanical force with a fixing jig, a press machine, etc. This improves easiness in assembling the sub air chamber into the well 11c and in accuracy in positioning the sub air chamber member 13.

Further, in the vehicle wheel 10 according to the eleventh embodiment, the sub air chamber member 13 can be solely checked in the resonance frequency and corrected in the resonance frequency before the sub air chamber member 13 is fitting into the rim 11. This reduces a percentage of defective products.

Figure 22A:
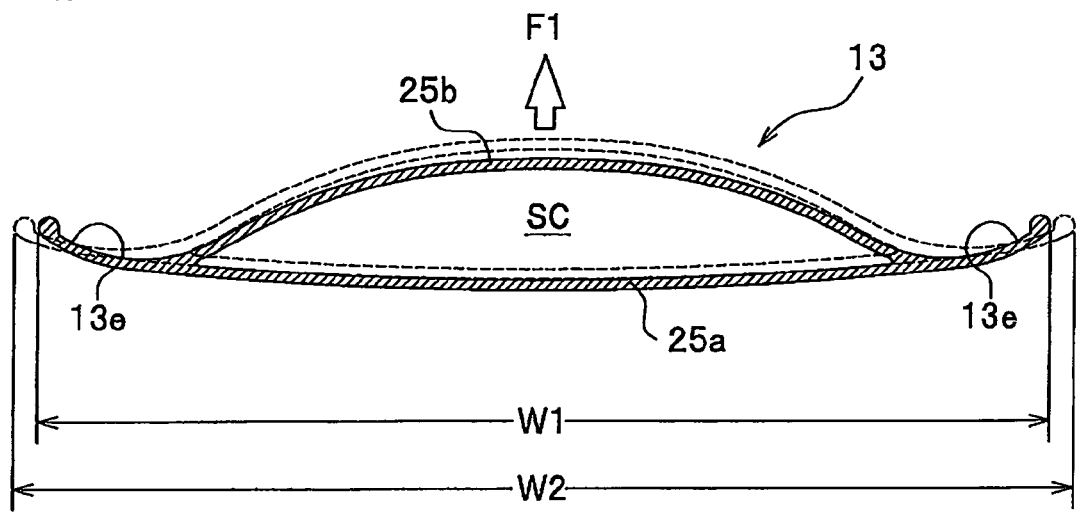
FIG. 22A is a cross sectional view showing behavior of the sub air chamber member according to the eleventh embodiment when a centrifugal force is applied thereto.
Figure 22B:
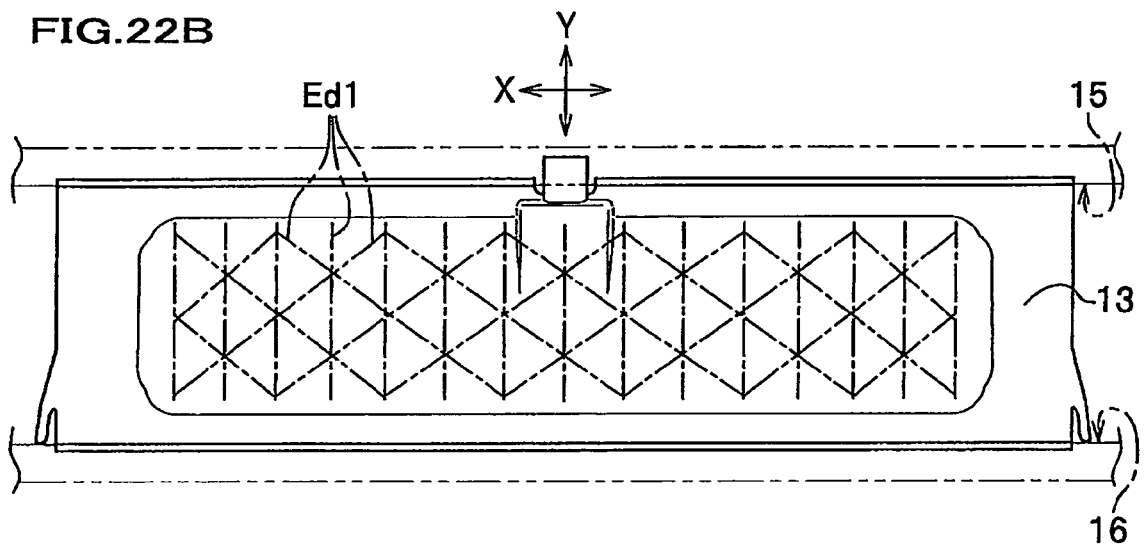
FIG. 22B is a plan view of the sub air chamber member to show beads thereon.

Further, in the vehicle wheel 10 according to the eleventh embodiment, the bottom plate 25a and the edge part 13 of the sub air chamber member 13 shown in FIG. 16 are curved such that the bottom plate 25a and the edge part 13 protrude toward the outer circumferential surface 11d of the well 11c (inwardly in the radial direction of the vehicle wheel 10). When a centrifugal force during rotation of the vehicle wheel 10 is applied to the sub air chamber member 13, the bottom plate 25a and the edge plate 13e begin to reversely protrude outwardly in the radial direction of the vehicle wheel 10. FIG. 22A is a cross sectional view showing behavior of the sub air chamber member when a centrifugal force is applied thereto, FIG. 22B is a plan view of the sub air chamber member to show beads thereon, and FIG. 22C a plan view of the sub air chamber member to show beads on a sub air chamber member of a comparison example. In FIG. 22A, the beads are not shown, and in FIGS. 22B and 22C, the beads and alignment directions are designated with dashed lines.

In the sub air chamber member 13 according to the eleventh embodiment, as shown in FIG. 22A, a span W2 between both edges of the edge parts 13e in the sub air chamber member 13 (denoted by broken lines) when the centrifugal force F1 is applied, becomes greater than a span W1 between both edges of the edge part 13e in the sub air chamber member 13A before the centrifugal force F1 is applied as indicated with broken lines.

On the other hand, as shown in FIG. 16, the edge part 13e of the sub air chamber member 13 is fitted into the channels 17 formed in the first vertical wall surface 15 and the second wall surface 16. When a centrifugal force F1 acts on the sub air chamber 13, pressure forces of the both edge of the edge parts 13e on the first vertical wall surface 15 and the second vertical wall surface 16 is increased. As the result, the sub air chamber member 13 is more surely fixed to the side of the well 11c.

In the sub air chamber member 13 according to the eleventh embodiment, as shown in FIG. 19A, first beads 31a and second beads 31b and 31c are formed on the bottom plate 25a. These beads 31 are, as shown in FIG. 22B, disposed such that extending directions Ed1 are set to intersect the first vertical wall surface 15 and the second wall surface 16. This prevents the sub air chamber member 13 from being dropped from the well 11c. This operation will be further described with reference to a comparison example.

Figure 22C:
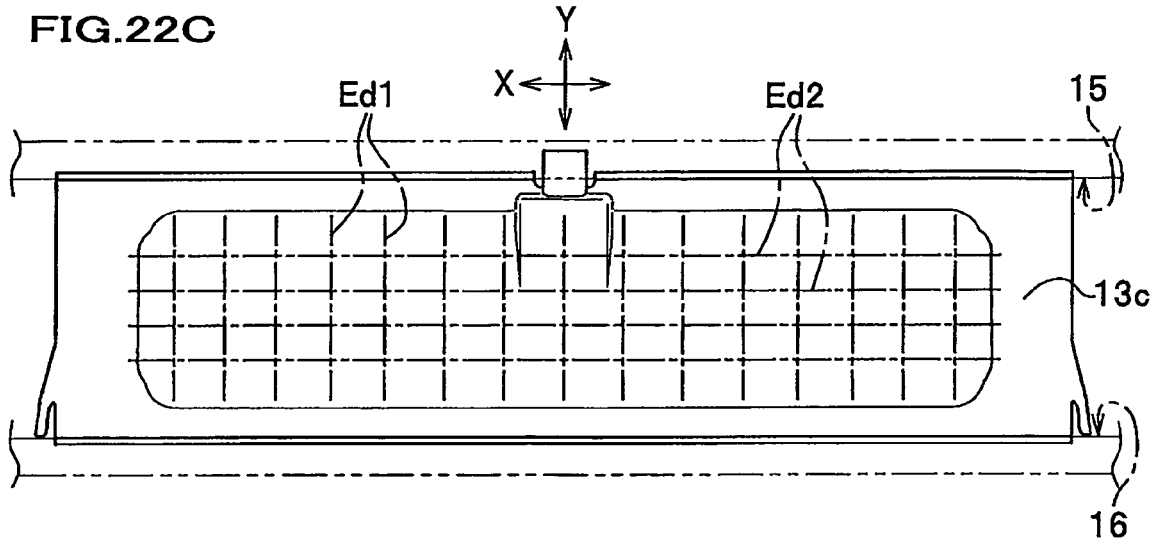
FIG. 22C a plan view of the sub air chamber member to show beads on a sub air chamber member of a comparison example.

As shown in FIG. 22C, the sub air chamber member 13c of the comparison example has beads (channels, folds) on a bottom plate 25a aligned in an extending direction Ed2 which is in parallel to the first vertical wall surface 15 and the second vertical wall surface 16. The sub air chamber member 13c also has beads aligned in the extending direction Ed1 (orthogonal with the first vertical wall surface 15 and the second vertical wall surface 16).

When the centrifugal force F1 is generated (see FIG. 22A), this sub air chamber member 13c of the comparison example has an insufficient bending stiffness in the bottom plate 25a against the centrifugal force F1 because the beads aligned in the extending direction Ed2 act as folding lines on the bottom plate 25a. As a result, the vehicle wheel having the sub air chamber member 13c of the comparison example may be dropped from the well 11c because the sub air chamber member 13c is deformed by the centrifugal force F1 due to high rotation speed caused by a high traveling speed over 200 km/h.

On the other hand, the sub air chamber member 13 according to the eleventh embodiment as shown in FIG. 22B has only beads aligned in the extending direction Ed1 intersecting the first vertical wall surface 15 and the second wall surface 16. In other words, the sub air chamber member 13 has the first bead 31a (see FIG. 19A) orthogonally intersecting the first vertical wall surface 15 and the second wall surface 16 on the bottom surface 25a as well as the second beads 31b and 31c (see FIG. 19A) diagonally intersecting the first vertical wall surface 15 and the second vertical wall surface 16. This provides a sufficient bending stiffness in the bottom plate 25a against the centrifugal force F1. As a result, in the vehicle wheel 10 having the sub air chamber member 13 (see FIG. 15) the sub air chamber member 13 can be strongly fixed to the well 11c against the centrifugal force F1 due to high rotation speed caused by a high traveling speed over 200 km/h.

Further, the sub air chamber member 13f according to the eleventh embodiment has an increased plane stiffness on the bottom plate 25a because the beads 31 are provided on the bottom plate 25a. As a result, the vehicle wheel 10 having the sub air chamber member 13 provides a desired performance in reducing noise by serving as the Helmholtz resonator with the variation in volume in the sub air chamber member SC being suppressed efficiently.

Further, in the vehicle wheel 10 according to the eleventh embodiment, because as mentioned above, the plane stiffness of the bottom plate 25a is increased with the beads 31, a thickness of the bottom plate 25a can be more reduced than that having no beads 31. As a result, the vehicle wheel 10 can be more reduced in weight than that having no beads 31 on the bottom plate 25a.

Further, in the vehicle wheel 10 according to the eleventh embodiment, as mentioned above, the upper plate 25b is bent so as to be swelled over the bottom plate 25a. As a result, in the vehicle wheel 10, when increase and decrease in the air pressure in the tire air chamber MC are repeated in phase with a cycle of air column resonation (see FIG. 15), the variation in the volume of the sub air chamber SC can be efficiently suppressed as compared with, for example, that having an upper plate which is flat. Therefore, the vehicle wheel 10 can stably provide a desired performance in reducing noise by serving as the Helmholtz resonator.

Further, the vehicle wheel 10 can efficiently suppress the variation in the volume in the sub air chamber SC. This can more reduce the thickness of the upper plate 25b than that having an upper plate which is flat. As a result, the vehicle wheel 10 can provide more reduction in weight as compared with that having the upper plate which is flat.

Further, the vehicle wheel 10 according to the eleventh embodiment, as mentioned above, the sub air chamber member 13 has the connecting parts 33 connecting the bottom plate 25a to the upper plate 25b. This further increases the plane stiffness of the bottom plate 25a and the upper plate 25b, which efficiently suppresses variation in the volume of the sub air chamber SC, and thus, the sub air chamber can more surly provide the desired performance in reducing noise by serving Helmholtz resonator.

Further, the vehicle wheel 10 according to the eleventh embodiment, the root 18a of the protruding part 18 is made flat, which tends to be low in plane stiffness. However, provided near the protruding part 18 are two connecting parts 33 aligned in a width direction Y of the vehicle wheel 10 (see FIG. 20B). As a result, the plane stiffness at the root 18a, which is relatively low, is increased by the connecting parts 33, so that variation in the volume of the sub air chamber SC can be efficiently suppressed. Thus, the vehicle wheel 10 can stably provide a desired noise reduction performance as a Helmholtz resonator.

Further, in the vehicle wheel 10, the protruding part 18 protruding in a direction intersecting the circumferential direction X of the wheel 10 is fitted into the notch 14a in the vertical wall 14. This surely stops the rotation of the sub air chamber member 13 in the circumferential direction X when the vehicle wheel 10 rotates.

Formed inside the protruding part 18 is the communication through hole 13b. This eliminates the necessity of parts for forming a special communication through hole in addition to the protruding part 18 serving as a stopper, which simplifies the vehicle wheel 10 in structure with a result that the weight is further reduced.

Further, in the vehicle wheel 10, as mentioned above, no special part to be attached to the vehicle wheel 10 is necessary for improving durability and noise reduction performance during a high rotation speed, which can reduce weight. In addition to the advantageous effect, the vehicle wheel 10 can provide increase in vehicle performance by decrease in weight of a part under springs of the vehicle and decrease in cost of parts.

The vehicle wheel according to the eleventh embodiment can be modified. In the vehicle wheels according to the below embodiments, the same parts in the aforementioned embodiments are designated with the same references, and thus, duplicated description will be omitted.

Twelfth Embodiment

Figure 23A:
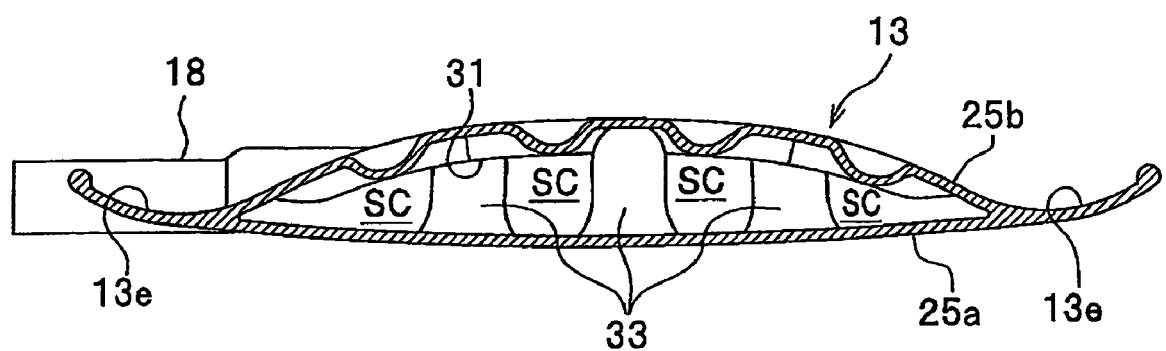
FIGS. 23A and 23B are cross sectional views of modified sub air chamber members to illustrate locations of the beads formed.
Figure 23B:
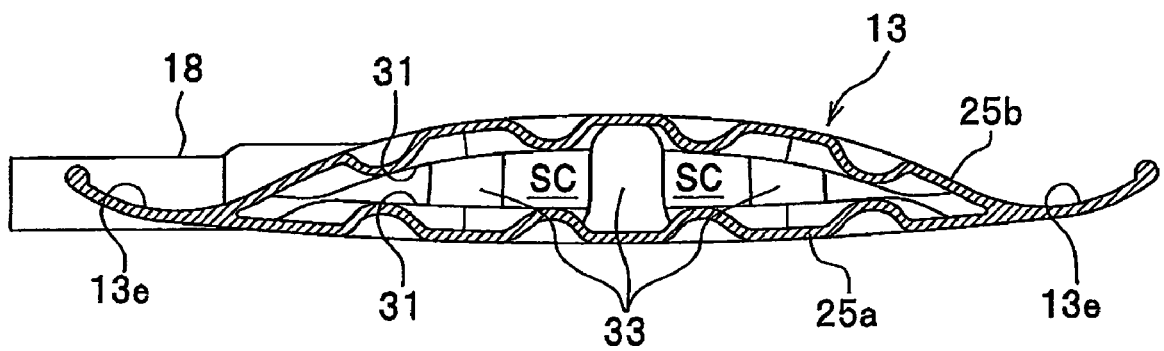

In the eleventh embodiment, the vehicle wheel 10 having the sub air chamber member 13 in which the beads 31 are formed on the bottom plate 25a has been described. However, the present invention is not limited to the eleventh embodiment. In other words, it is also possible that the beads 32 are formed on at least one of the bottom plate 25a and the upper plate 25b. FIG. 23A and 23B are cross sectional views of modified sub air chamber member to illustrate locations of the beads formed.

In the sub air chamber 13 shown in FIG. 23A has beads 31 only on the upper plate 25b. In the sub air chamber member 13 of the modification, the first beads 31a and the second beads 31b and 31c are formed in extending directions intersecting the first vertical wall surface 15 and the second vertical wall surface 16 (not shown) like the beads 31 (see FIG. 19A) of the eleventh embodiment. In FIG. 23A, in the sub air chamber member 13 according to the twelfth embodiment, the edge part 13e, the bottom plate 25a, the connecting part 33, and the sub air chamber SC are shown.

The sub air chamber member 13 shown in FIG. 23B has the beads 31 both on the bottom plate 25a and the upper plate 25b like the eleventh embodiment. The sub air chamber 13 shown in FIG. 23B has an increased plane stiffness in the upper plate 25b. This efficiently suppresses variation in the volume of the sub air chamber SC. Accordingly, the vehicle wheel 10 surely provides a desired noise reduction performance.

In FIG. 23B, in the sub air chamber member 13 according to the twelfth embodiment, the edge part 13e, the bottom plate 25a, the connecting part 33, and the sub air chamber SC are shown.

The connecting parts 33 of the sub air chamber member 13 shown in FIGS. 23A and 23B are formed such that the bottom plate 25a are locally hollowed toward the upper plate 25b like the connecting parts 33 of the eleventh embodiment.

Thirteenth Embodiment

Figure 24A:
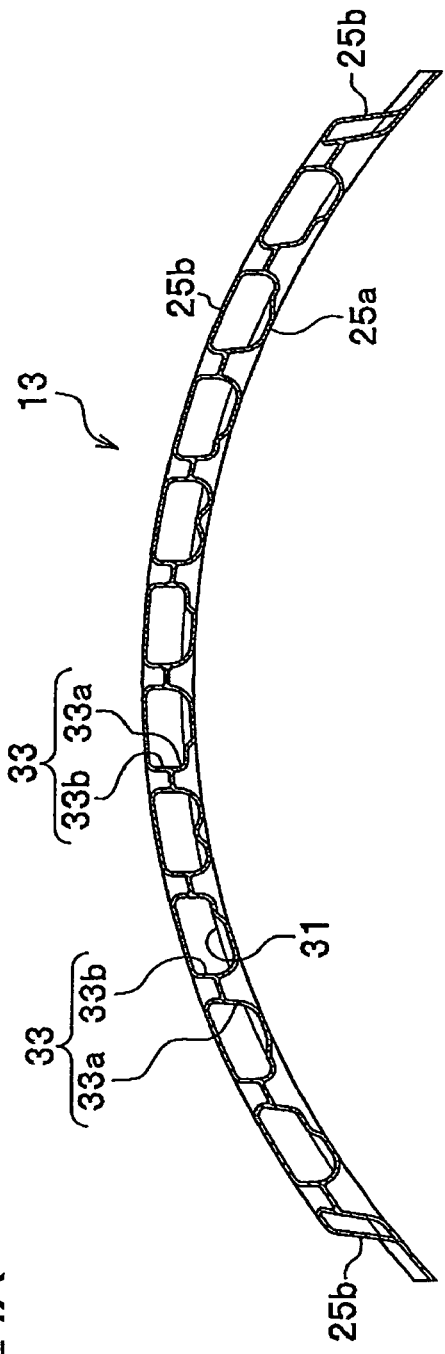
FIGS. 24A and 24B are cross sectional views of the modified sub air chamber according to a twelfth embodiment.
Figure 24B:
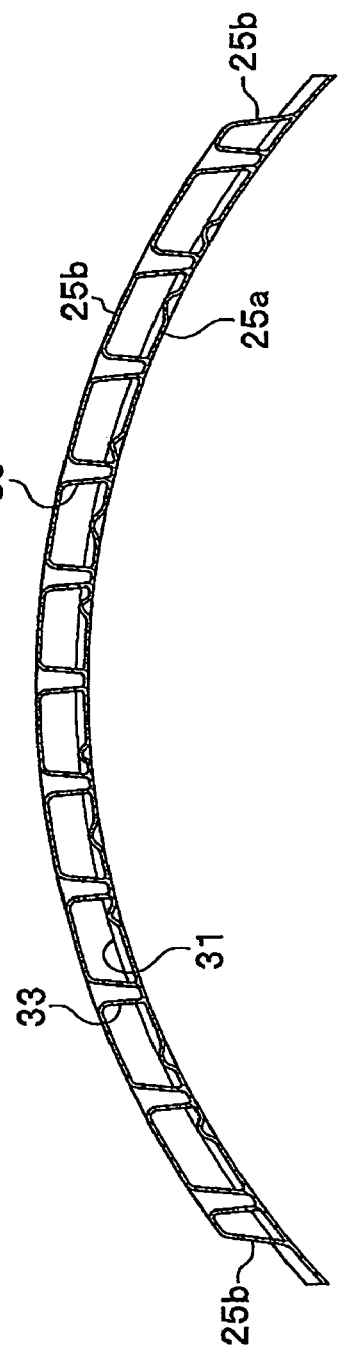

In the twelfth embodiment, the sub air chamber member 13 has the connecting parts 13 formed such that the parts of the bottom plate 25a are hollowed toward the upper plate 25b. However, the present invention is not limited to this. In other words, at least one of the bottom plate 25a and the upper plate 25b are locally hollowed toward the other. FIGS. 24A and 24B are cross sectional views of the modified sub air chamber according to the twelfth embodiment.

In the sub air chamber member 13 shown in FIG. 24A, the connecting part 33 has a lower half 33a and an upper half 33b. The lower half 33a is formed such that the bottom plate 25a is locally hollowed toward the upper plate 25b to have a cup shape, and the upper half 33b is formed such that the upper plate 25b is locally hollowed toward the bottom plate 25a to have a cup shape. More specifically, in the sub air chamber member 13 of the modification according to the twelfth embodiment, the connecting part 33 is formed by locally hollowing both the bottom plate 25a and the upper plate 25b oppositely at corresponding locations. The bottoms of the lower half 33a and the upper half 33b are connected at the middle between the bottom plate 25a and the upper plate 25b.

In the sub air chamber member 13 shown in FIG. 24A, the connecting part 33 is formed such that the upper plate 25b is locally hollowed toward the bottom plate 25a to have a cup shape.

In FIGS. 24A and 24B, in the sub air chamber member 13 according to the twelfth embodiment, the beads 31 are formed on the bottom plate 25a like the beads 31 of the eleventh embodiment.

Further, the connecting parts 33 are aligned in a plurality of lines in the width direction Y of the wheel 10 (see FIG. 19A).

Fourteenth Embodiment

Figure 25:
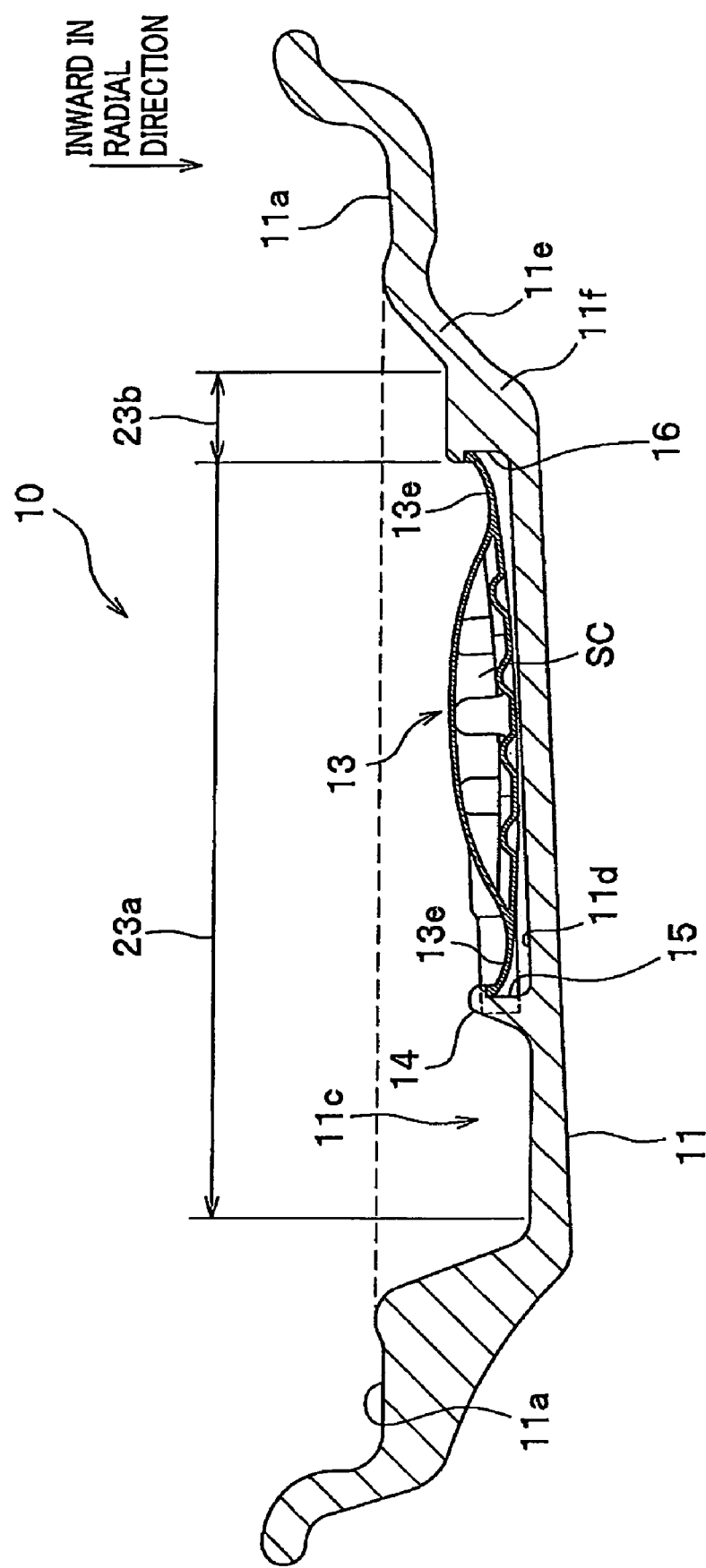
FIG. 25 is a cross sectional view of a rim of a vehicle wheel according to a fourteenth embodiment.

In the eleventh embodiment, the vehicle wheel 10 has the second vertical wall surface 15 in a side surface part 11e. However, the present invention is not limited to this, but the vertical wall surface 16 may be formed in another rising surface of the well 11c. FIG. 25 is a cross sectional view of a rim of a vehicle wheel according to a fourteenth embodiment.

As shown in FIG. 25, the well 11c of the rim 11 used in the vehicle wheel 10 has a small diameter part 23a and a large diameter part 23b connected to the small diameter part 23a through a step 11f. In the rim 11, the bead seat 11a is formed outside the large diameter part 23b via the side surface part 11e of the well 11c. More specifically, in the fourteenth embodiment, the edge part 13e of the sub air chamber member 13 is fitted into a channel in the step 11f which is located more inward in the radial direction than the side surface part 11e of the sub air chamber of the eleventh embodiment (see FIG. 16).

Accordingly, in the vehicle wheel 10 of the fourteenth embodiment, the outer circumferential surface 11d of the well 11c for fixing the sub air chamber member 13 is formed more inwardly in the radial direction of the wheel 10 than the vehicle wheel 10 of the eleventh embodiment.

As a result, the vehicle wheel 10 of the fourteenth embodiment 10 has a shortened length of the outer circumferential surface 11d of the well 11c, which further reduces the weight. The vehicle wheel 10 according to the fourteenth embodiment has a higher performance in putting the tire 20 on the rim 11 than the vehicle wheel 10 according to the eleventh embodiment because the sub air chamber member 13 is shifted apart from the bead seat 11a inwardly in the radial direction of the wheel 10.

Fifteenth Embodiment

In the vehicle wheel of the eleventh embodiments, four sub air chamber members 13 are equi-distantly disposed along the outer circumferential surface 11d of the well 11c. However, if the number of the sub air chamber members 13 may be five or more, or three or less.

Figure 26A:
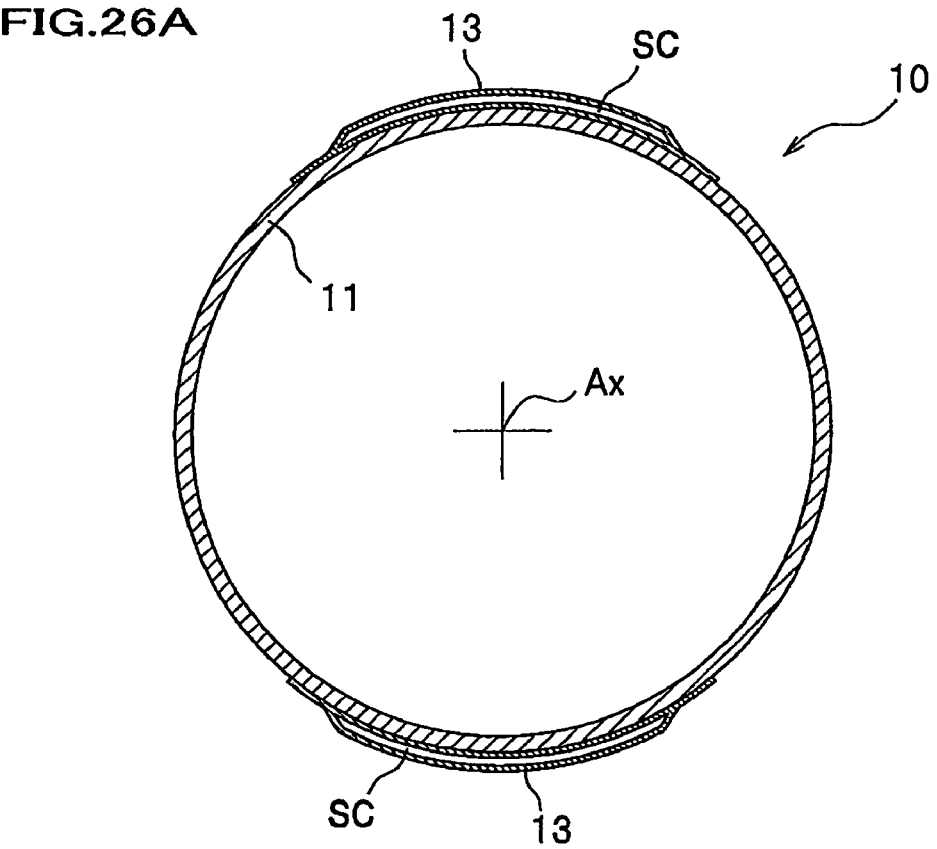
FIG. 26A is a side sectional view of the vehicle wheel according to a fifteenth embodiment to show two sub air chambers disposed.
Figure 26B:
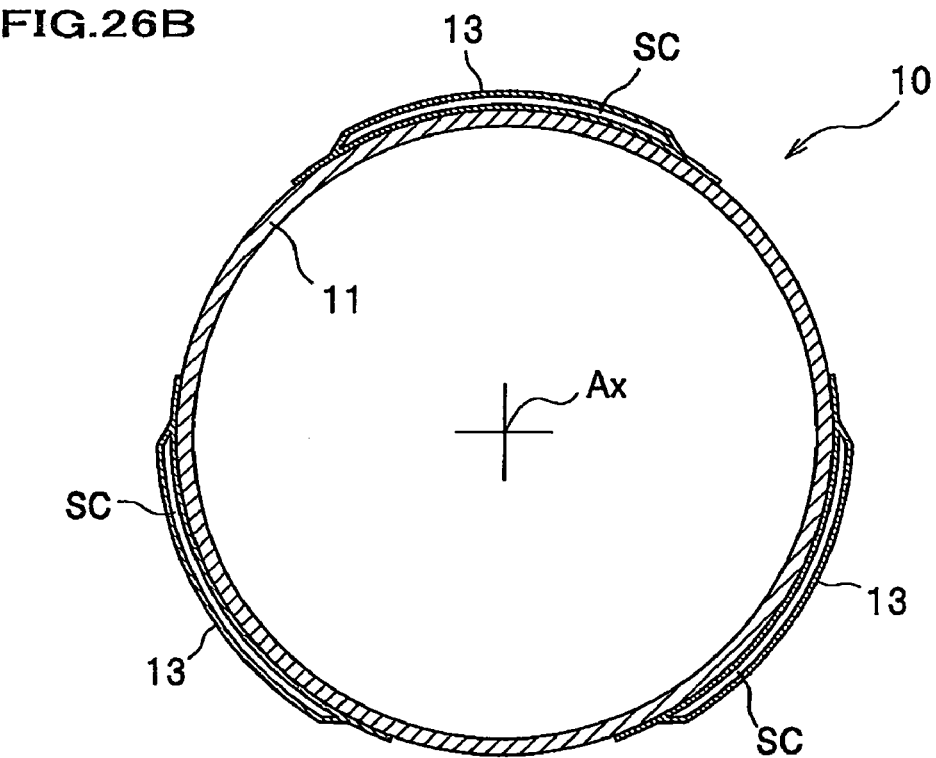
FIG. 26B is a side sectional view of the vehicle wheel according to the fifteenth embodiment to show three sub air chambers disposed.

FIGS. 26A and 26B are side sectional views of the vehicle wheel according to the fifteenth embodiment, wherein the arrangement of the sub air chamber members is modified. The vehicle wheel 10 shown in FIG. 26A has two sub air chamber members 13 located equi-distantly along the circumferential surface of the well 11c.

The vehicle wheel 10 shown in FIG. 26B has three sub air chamber members 13 located equi-distantly along the circumferential surface of the well 11c.

As mentioned above, the vehicle wheel 10 according to the present invention is not limited in the number of the sub air chamber members 13, but in consideration of an efficiency in noise reduction performance, it is preferable that four or more (two or more pairs of) sub air chamber members 13 are oppositely arranged about the wheel rotation center axis Ax. Further, in consideration of the reduction in weight or mass productivity of the vehicle wheel 10, it is preferable that from two to four sub air chamber members 13 are disposed equi-distantly along the circumferential surface of the well 11c.

Figure 27A:
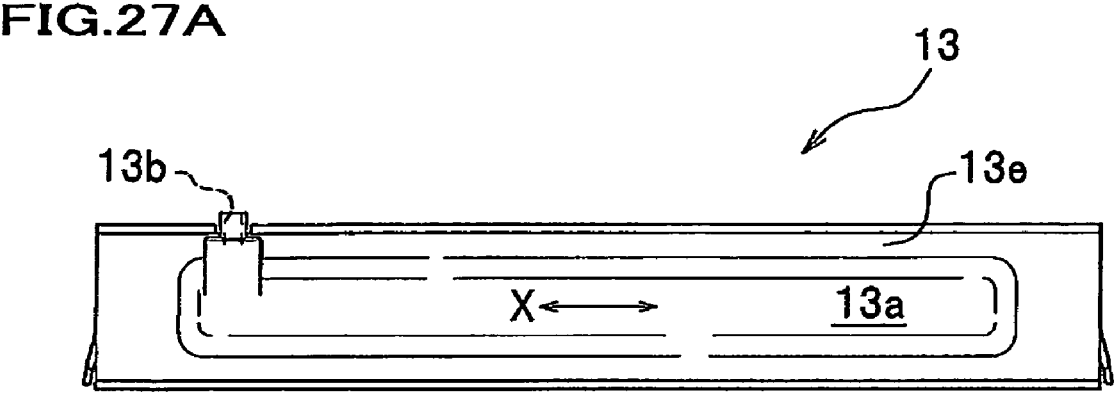
FIGS. 27A and 27B are plan views of the sub air chamber members to show locations of the communication through holes.
Figure 27B:
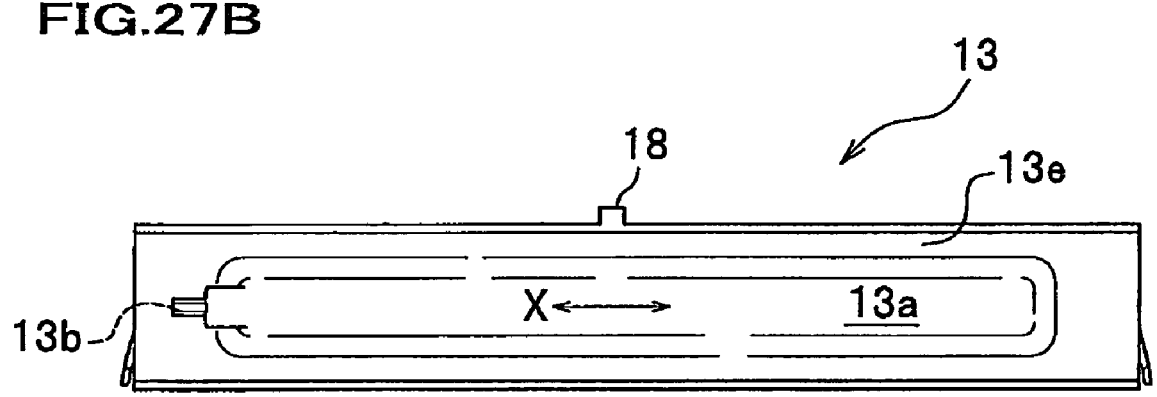

Further, in the eleventh embodiment, the communication through hole 13b is formed at middle of the sub air chamber member 13 in the longitudinal direction of the sub air chamber member 13, but the present invention is not limited to this. More specifically, the location of the communication through hole 13b is not limited. FIGS. 27A and 27B are plan views of the sub air chamber members to show locations of the communication through holes 13b.

The sub air chamber member 13 shown in FIG. 27A has a pipe including the communication through hole 13b at an end in the longitudinal direction of the sub air chamber member 13. The pipe, which is fitted into the notch 14a in the vertical wall 14 (see FIG. 20A) also serves as a stopper for preventing the sub air chamber member 13 from shifting. The pipe protrudes from the body 13a in a direction orthogonally intersecting the wheel circumferential direction X. In FIG. 27B, reference 13e denotes the edge part.

The sub air chamber member 13 shown in FIG. 27B has the pipe, having the communication through hole 13b, protruding from the body 13a in the circumferential direction X of the wheel at one end in the longitudinal direction of the sub air chamber member 13. The sub air chamber member 13 shown in FIG. 27B has a protruding part 18 for preventing the sub air chamber member 13 from rotating like the pipe shown in FIG. 27A. The protruding part 18 protrudes from the edge part 13e in a direction intersecting the circumferential direction X at middle in the longitudinal direction of the sub air chamber member 13. The protruding part 18 is fitted into the notch 14a (see FIG. 20A) formed in the vertical wall 14 (see FIG. 20A).

Sixteenth Embodiment

In the eleventh embodiment, at least one of the bottom plate 25a and the upper plate 25b of the sub air chamber member 13 has both first bead 31a and the second bead 31b and 31c. However, in the present invention, it is sufficient that the beads 31 intersect the first vertical wall surface 15 and the second vertical wall surface 16. Thus, the sub air chamber member 13 may have either of the first bead 31a or the second bead 31b and 31c.

In the eleventh embodiment, the sub air chamber member 13 has the beads 31 on at least one of the bottom plate 25a and the upper plate 25b of the sub air chamber member 13. However, in the present invention, either one of the bottom plate 25a or the upper plate 25b may have a concavoconvex structure other than the beads 31. FIG. 28A is a plan view of the modification of the sub air chamber in which a concavoconvex structure is formed on the bottom plate 25a. FIG. 28B is a cross sectional view taken along line XVb-XVb in FIG. 28A. In FIG. 28A, a part of the upper plate is cut away.

As shown in FIG. 28A, the sub air chamber member 13 according to the sixteenth embodiment, the bottom plate 25a has the bead 31a like the eleventh embodiment. The sub air chamber member 13 has the first bead 31a orthogonally intersecting the first vertical wall surface 15 and the second wall surface 16 when viewed from the side of the upper plate 25b. In other words, the first beads 31a are formed in an extending direction orthogonally intersecting the first vertical wall surface 15 and the second wall surface 16 along the outer circumferential surface 11d. Further, the first beads 31a are formed in an extending direction orthogonally intersecting the circumferential direction X of the outer circumferential surface 11d.

On the bottom plate 25a, the concavoconvex structure 32 is formed on the bottom plate 25a at parts other than the parts where the first beads 31a are formed.

The concavoconvex structure 32 is formed by a plurality of partial spherical surfaces 32a protruding from the inside of the sub air chamber SC toward the outside of the sub air chamber SC over the entire surface of the bottom plate 25a. In other words, preferably, the partial spherical surfaces 32a protrude in a direction in which a pressure is applied when the internal pressure of the sub air chamber SC increases. The partial spherical surface 32a corresponds to a protruding part. In FIGS. 28A and 28B, the body 13a, the edge part 13e, the upper plate 25b, the connecting parts 33, and the sub air chamber SC are shown.

Further, the concavoconvex structure 32 has the partial spherical surfaces 32a having the same radius which are successively disposed in which six partial spherical surfaces are disposed around one partial spherical surface 32a to have a maximum density structure. The protruding part forming the concavoconvex structure 32 is not limited to the partial spherical surface 32a, but an exterior shape of the protruding part may be a cube shape other than the spherical shape. More specifically, the protruding part may be a sleeve with a bottom, and the shape in plan view of the sleeve may be a circle or a polygonal. Further, the arrangement of the protruding parts is not limited to the maximum density structure. If the shape of the protruding part comprising a sleeve is a rectangular in side view, adjoining protruding parts are not lapped each other. In other words, the adjoining protruding parts are disposed so as to provide concave parts and protruding parts.

The concavoconvex structure 32 increases the bottom plate in plane stiffness together with the first beads 31a. As a result, the sub air chamber member 13 having the concavoconvex structure 32 efficiently suppresses the variation in the volume of the sub air chamber SC. Accordingly, the vehicle wheel 10 of the sub air chamber 13 (see FIG. 1) surely provides a desired noise reduction performance.

Further, the concavoconvex structure 32 can be formed only on the upper plate 25b, and may be formed both on the bottom plate 25a and the upper plate 25b.

Further, if the beads 31 are formed only on either of the bottom plate 25a or the upper plate 25b as the concavoconvex structure 32, it may be sufficient that only the concavoconvex structure 32 is formed on the counter part of the bottom plate 25a or the upper plate 25b.

In the sub air chamber member shown in FIG. 28A, a combination of the first beads 31a and the concavoconvex structure 32 is used. However, a combination of the second bead 31b and 31c with the concavoconvex structure 32 may be used. Further, a combination of the first beads 31a, the second beads 31b and 31c and the concavoconvex structure 32 may be used.

The invention claimed is:

1. A wheel for a vehicle comprising:
a disk and a rim which comprises a well, fixed to an outer circumference of the disk for supporting a tire for the vehicle;
a sub air chamber member made of plastic on the well in a tire air chamber between the rim and the tire, the rim further comprising:
a first vertical wall surface, having a first channel, extending from an outer circumferential surface of the well outwardly in a radial direction of the wheel and in a circumferential direction of the outer circumferential surface;
a second vertical wall surface on the well, having a second channel, facing the first vertical wall surface, the sub air chamber member comprising:
a body including:
a bottom plate on the side of the outer circumferential surface of the well;
an upper plate, the bottom plate and the upper plate forming a sub air chamber therebetween; and
a communication through hole for communicating the sub air chamber with the tire air chamber; and
an edge part that connects the bottom plate to the upper plate and extends from the body toward the first and second vertical wall surfaces and is fitted into to be fixed by the first and second channels, wherein at least one of the upper plate and the bottom plate has a bead;
wherein at least one of the upper plate and the bottom plate comprises a connecting part so as to be locally hollowed toward inside of the sub air chamber to partially connect the upper plate and the bottom plate.

2. A wheel for a vehicle comprising:
a disk and a rim which comprises a well, fixed to an outer circumference of the disk for supporting a tire for the vehicle;
a sub air chamber member made of plastic on the well in a tire air chamber between the rim and the tire, the rim further comprising:
a first vertical wall surface, having a first channel, extending from an outer circumferential surface of the well outwardly in a radial direction of the wheel and in a circumferential direction of the outer circumferential surface;
a second vertical wall surface on the well, having a second channel, facing the first vertical wall surface, the sub air chamber member comprising:
a body including:
a bottom plate on the side of the outer circumferential surface of the well;
an upper plate, the bottom plate and the upper plate forming a sub air chamber therebetween;
a communication through hole for communicating the sub air chamber with the tire air chamber; and
an edge part that connects the bottom plate to the upper plate and extends from the body toward the first and second vertical wall surfaces and is fitted into to be fixed by the first and second channels, wherein at least one of the upper plate and the bottom plate comprises a connecting part so as to be locally hollowed toward inside of the sub air chamber to partially connect the upper plate and the bottom plate.

3. A wheel for a vehicle comprising:
a disk and a rim which comprises a well, fixed to an outer circumference of the disk for supporting a tire for the vehicle;

a sub air chamber member made of plastic on the well in a tire air chamber between the rim and the tire, the rim further comprising:
a first vertical wall surface, having a first channel, extending from an outer circumferential surface of the well outwardly in a radial direction of the wheel and in a circumferential direction of the outer circumferential surface;
a second vertical wall surface on the well, having a second channel, facing the first vertical wall surface, the sub air chamber member comprising:
a body including:
   a bottom plate on the side of the outer circumferential surface of the well;
   an upper plate, the bottom plate and the upper plate forming a sub air chamber therebetween; and
   a communication through hole for communicating the sub air chamber with the tire air chamber; and
an edge part that connects the bottom plate to the upper plate and extends from the body toward the first and second vertical wall surfaces and is fitted into to be fixed by the first and second channels, wherein at least one of the upper plate and the bottom plate comprises a bead extending in a direction, along the outer circumferential surface, which intersects the first and second vertical wall surfaces.

4. The wheel as claimed in claim 3, wherein at least one of the upper plate and the bottom plate comprises a connecting part so as to be locally hollowed toward inside of the sub air chamber to partially connect the upper plate and the bottom plate.

5. The wheel as claimed in claim 3, wherein at least one of the upper plate and the bottom plate comprises protruding parts over a whole surface thereof so as to be protruding toward outside of the sub air chamber.

6. A wheel for a vehicle comprising:
a disk and a rim which comprises a well, fixed to an outer circumference of the disk for supporting a tire for the vehicle;
a sub air chamber member made of plastic on the well in a tire air chamber between the rim and the tire, the rim further comprising:
a first vertical wall surface, having a first channel, extending from an outer circumferential surface of the well outwardly in a radial direction of the wheel and in a circumferential direction of the outer circumferential surface;
a second vertical wall surface on the well, having a second channel, facing the first vertical wall surface, the sub air chamber member comprising:
a body including:
   a bottom plate on the side of the outer circumferential surface of the well;
   an upper plate, the bottom plate and the upper plate forming a sub air chamber therebetween; and
   a communication through hole for communicating the sub air chamber with the tire air chamber; and
an edge part that connects the bottom plate to the upper plate and extends from the body toward the first and second vertical wall surfaces and is fitted into to be fixed by the first and second channels, wherein at least one of the upper plate and the bottom plate comprises a bead extending in a direction, along the outer circumferential surface, which orthogonally intersects the first and second vertical wall surfaces.

7. A wheel for a vehicle comprising:
a disk and a rim which comprises a well, fixed to an outer circumference of the disk for supporting a tire for the vehicle;
a sub air chamber member made of plastic on the well in a tire air chamber between the rim and the tire, the rim further comprising:
a first vertical wall surface, having a first channel, extending from an outer circumferential surface of the well outwardly in a radial direction of the wheel and in a circumferential direction of the outer circumferential surface;
a second vertical wall surface on the well, having a second channel, facing the first vertical wall surface, the sub air chamber member comprising:
a body including:
   a bottom plate on the side of the outer circumferential surface of the well;
   an upper plate, the bottom plate and the upper plate forming a sub air chamber therebetween; and
   a communication through hole for communicating the sub air chamber with a tire air chamber between the tire and the rim; and
an edge part that connects the bottom plate to the upper plate and extends from the body toward the first and second vertical wall surfaces and is fitted into to be fixed by the first and second channels, wherein at least one of the upper plate and the bottom plate comprises a bead extending in a direction, along the outer circumferential surface, which is diagonally intersects the first and second vertical wall surfaces.

8. A wheel for a vehicle comprising:
a disk and a rim which comprises a well, fixed to an outer circumference of the disk for supporting a tire for the vehicle;
a sub air chamber member made of plastic on the well in a tire air chamber between the rim and the tire, the rim further comprising:
a first vertical wall surface, having a first channel, extending from an outer circumferential surface of the well outwardly in a radial direction of the wheel and in a circumferential direction of the outer circumferential surface;
a second vertical wall surface on the well, having a second channel, facing the first vertical wall surface, the sub air chamber member comprising:
a body including:
   a bottom plate on the side of the outer circumferential surface of the well;
   an upper plate, the bottom plate and the upper plate forming a sub air chamber therebetween; and
   a communication through hole for communicating the sub air chamber with the tire air chamber; and
an edge part that connects the bottom plate to the upper plate and extends from the body toward the first and second vertical wall surfaces and is fitted into to be fixed by the first and second channels; wherein the upper plate curves so as to be apart from the outer circumferential surface of the well;
wherein at least one of the upper plate and the bottom plate has a bead; and
wherein the bead projects from at least one of the upper plate and the bottom plate relative to the sub air chamber.

9. A wheel for a vehicle comprising:
a disk and a rim which comprises a well, fixed to an outer circumference of the disk for supporting a tire for the vehicle;

a sub air chamber member made of plastic on the well in a tire air chamber between the rim and the tire, the rim further comprising:
  a first vertical wall surface, having a first channel, extending from an outer circumferential surface of the well outwardly in a radial direction of the wheel and in a circumferential direction of the outer circumferential surface;
  a second vertical wall surface on the well, having a second channel, facing the first vertical wall surface, the sub air chamber member comprising:
    a body including:
      a bottom plate on the side of the outer circumferential surface of the well;
      an upper plate, the bottom plate and the upper plate forming a sub air chamber therebetween; and
      a communication through hole for communicating the sub air chamber with the tire air chamber; and
    an edge part that connects the bottom plate to the upper plate and extends from the body toward the first and second vertical wall surfaces and is fitted into to be fixed by the first and second channels; wherein the upper plate curves so as to be apart from the outer circumferential surface of the well;
  wherein at least one of the upper plate and the bottom plate has a bead; and
  wherein the bead projects inwardly of the sub air chamber from at least one of the upper plate and the bottom plate.

10. A wheel for a vehicle comprising:
  a disk and a rim which comprises a well, fixed to an outer circumference of the disk for supporting a tire for the vehicle;
  a sub air chamber member made of plastic on the well in a tire air chamber between the rim and the tire, the rim further comprising:
  a first vertical wall surface, having a first channel, extending from an outer circumferential surface of the well outwardly in a radial direction of the wheel and in a circumferential direction of the outer circumferential surface;
  a second vertical wall surface on the well, having a second channel, facing the first vertical wall surface, the sub air chamber member comprising:
    a body including:
      a bottom plate on the side of the outer circumferential surface of the well;
      an upper plate, the bottom plate and the upper plate forming a sub air chamber therebetween; and
      a communication through hole for communicating the sub air chamber with the tire air chamber; and
    an edge part that connects the bottom plate to the upper plate and extends from the body toward the first and second vertical wall surfaces and is fitted into to be fixed by the first and second channels, wherein at least one of the upper plate and the bottom plate has a bead;
  wherein the bead projects from at least one of the upper plate and the bottom plate relative to the sub air chamber.

11. A wheel for a vehicle comprising:
  a disk and a rim which comprises a well, fixed to an outer circumference of the disk for supporting a tire for the vehicle;
  a sub air chamber member made of plastic on the well in a tire air chamber between the rim and the tire, the rim further comprising:
  a first vertical wall surface, having a first channel, extending from an outer circumferential surface of the well outwardly in a radial direction of the wheel and in a circumferential direction of the outer circumferential surface;
  a second vertical wall surface on the well, having a second channel, facing the first vertical wall surface, the sub air chamber member comprising:
    a body including:
      a bottom plate on the side of the outer circumferential surface of the well;
      an upper plate, the bottom plate and the upper plate forming a sub air chamber therebetween; and
      a communication through hole for communicating the sub air chamber with the tire air chamber; and
    an edge part that connects the bottom plate to the upper plate and extends from the body toward the first and second vertical wall surfaces and is fitted into to be fixed by the first and second channels, wherein at least one of the upper plate and the bottom plate has a bead;
  wherein the bead projects inwardly of the sub air chamber from at least one of the upper plate and the bottom plate.

* * * * *